US012067597B2

(12) United States Patent
Volkovich et al.

(10) Patent No.: US 12,067,597 B2
(45) Date of Patent: Aug. 20, 2024

(54) FAIR DEMOGRAPHIC RATIO PACING

(71) Applicant: Microsoft Technology Licensing, LLC, Redmond, WA (US)

(72) Inventors: Yana Volkovich, New York, NY (US); Moussa Taifi, Jackson Heights, NY (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/940,941

(22) Filed: Sep. 8, 2022

(65) Prior Publication Data

US 2023/0005025 A1  Jan. 5, 2023

Related U.S. Application Data

(63) Continuation of application No. 16/684,111, filed on Nov. 14, 2019, now abandoned.

(51) Int. Cl.
*G06Q 30/0273* (2023.01)
*G06Q 30/0241* (2023.01)
(Continued)

(52) U.S. Cl.
CPC ..... *G06Q 30/0275* (2013.01); *G06Q 30/0244* (2013.01); *G06Q 30/0269* (2013.01); *G06Q 30/0277* (2013.01)

(58) Field of Classification Search
None
See application file for complete search history.

(56) References Cited

U.S. PATENT DOCUMENTS 8,175,914 B1 * 5/2012 Benson ................ G06Q 10/025
705/41
2010/0138291 A1 * 6/2010 Silverman .......... G06Q 30/0275
705/14.46
(Continued)

OTHER PUBLICATIONS

Williams ("How algorithms discriminate based on data they lack: Challenges, solutions, and policy implications", Journal of Information Policy 8 (2018), pp. 78-115) (Year: 2018).*
(Continued)

*Primary Examiner* — Christopher B Tokarczyk
(74) *Attorney, Agent, or Firm* — CALFEE, HALTER & GRISWOLD LLP

(57) ABSTRACT

Aspects of the subject disclosure may include, for example, receiving information defining an attribute of interest for the impression, wherein the attribute of interest comprises a plurality of categories of values, and receiving information defining a respective probability for each respective value of the plurality of categories of values for the impression. Further, information about current values of the plurality of categories for the attribute of interest may be received and a pacing value may be determined based on the respective probability for each respective value of the plurality of categories of values, along with the information about current values the plurality of categories for the attribute of interest. A respective bid value of a bid may be adjusted using the pacing value and the adjusted bid value may be used in an auction to fill the impression. This permits automatic detection and correction of an inadvertent skew introduced when serving ads and other content. Other embodiments are disclosed.

20 Claims, 15 Drawing Sheets

(51) Int. Cl.
*G06Q 30/0242* (2023.01)
*G06Q 30/0251* (2023.01)

(56) References Cited

U.S. PATENT DOCUMENTS

| | | | | |
|---|---|---|---|---|
| 2011/0313814 | A1* | 12/2011 | Briggs | G06Q 30/0202 |
| | | | | 705/7.31 |
| 2013/0124308 | A1* | 5/2013 | Hegeman | G06Q 10/04 |
| | | | | 705/14.48 |
| 2013/0246160 | A1* | 9/2013 | Farahat | G06Q 30/02 |
| | | | | 705/14.43 |
| 2015/0213488 | A1* | 7/2015 | Karande | G06Q 30/0246 |
| | | | | 705/14.45 |
| 2015/0363792 | A1* | 12/2015 | Arini | G06Q 30/0201 |
| | | | | 705/7.29 |
| 2016/0055320 | A1* | 2/2016 | Wang | G16H 15/00 |
| | | | | 705/2 |
| 2016/0292714 | A1* | 10/2016 | Bhalgat | G06Q 30/0242 |
| 2016/0335659 | A1* | 11/2016 | Lewis | G06Q 30/0275 |
| 2019/0392019 | A1* | 12/2019 | Brannon | G06F 16/9574 |
| 2021/0150584 | A1 | 5/2021 | Volkovich et al. | |

OTHER PUBLICATIONS

"Office Action for U.S. Appl. No. 16/684,111", Mailed Date: Apr. 28, 2021, 64 pages.

"Response to the Office Action for U.S. Appl. No. 16/684,111", Filed Date: Jul. 28, 2021, 26 pages.

"Final Office Action for U.S. Appl. No. 16/684,111", Mailed Date: Oct. 27, 2021, 11 pages.

Williams, et al., "How Algorithms Discriminate Based on Data They Lack: Challenges, Solutions, and Policy Implications", In Journal of Information Policy 8, 2018, pp. 78-115.

"Response to the Final Office Action for U.S. Appl. No. 16/684,111", Filed Date: Jan. 26, 2022, 21 pages.

"Office Action for U.S. Appl. No. 16/684,111", Mailed Date: Feb. 14, 2022, 11 pages.

"Response to the Office Action for U.S. Appl. No. 16/684,111", Filed Date: May 12, 2022, 20 pages.

"Notice of Allowance and Fees Due for U.S. Appl. No. 16/684,111", Mailed Date: Jun. 8, 2022, 9 pages.

* cited by examiner

316

FAIR DEMOGRAPHIC RATIO PACING

RELATED APPLICATION

This application is a continuation of U.S. patent application Ser. No. 16/684,111, filed on Nov. 14, 2019, and entitled "FAIR DEMOGRAPHIC RATIO PACING", the entirety of which is incorporated herein by reference.

FIELD OF THE DISCLOSURE

The subject disclosure relates to fair demographic ratio pacing in online content delivery systems.

BACKGROUND

Delivery of online information including advertisements is often targeted to particular audiences. Targeting may be based on any factor of interest, such as demographic makeup of an audience of interest, geographic location of an audience of interest, past online activities of an audience of interest. Targeting may be customized for particular content providers.

BRIEF DESCRIPTION OF THE DRAWINGS

Reference will now be made to the accompanying drawings, which are not necessarily drawn to scale, and wherein.

DETAILED DESCRIPTION

Figure 1:
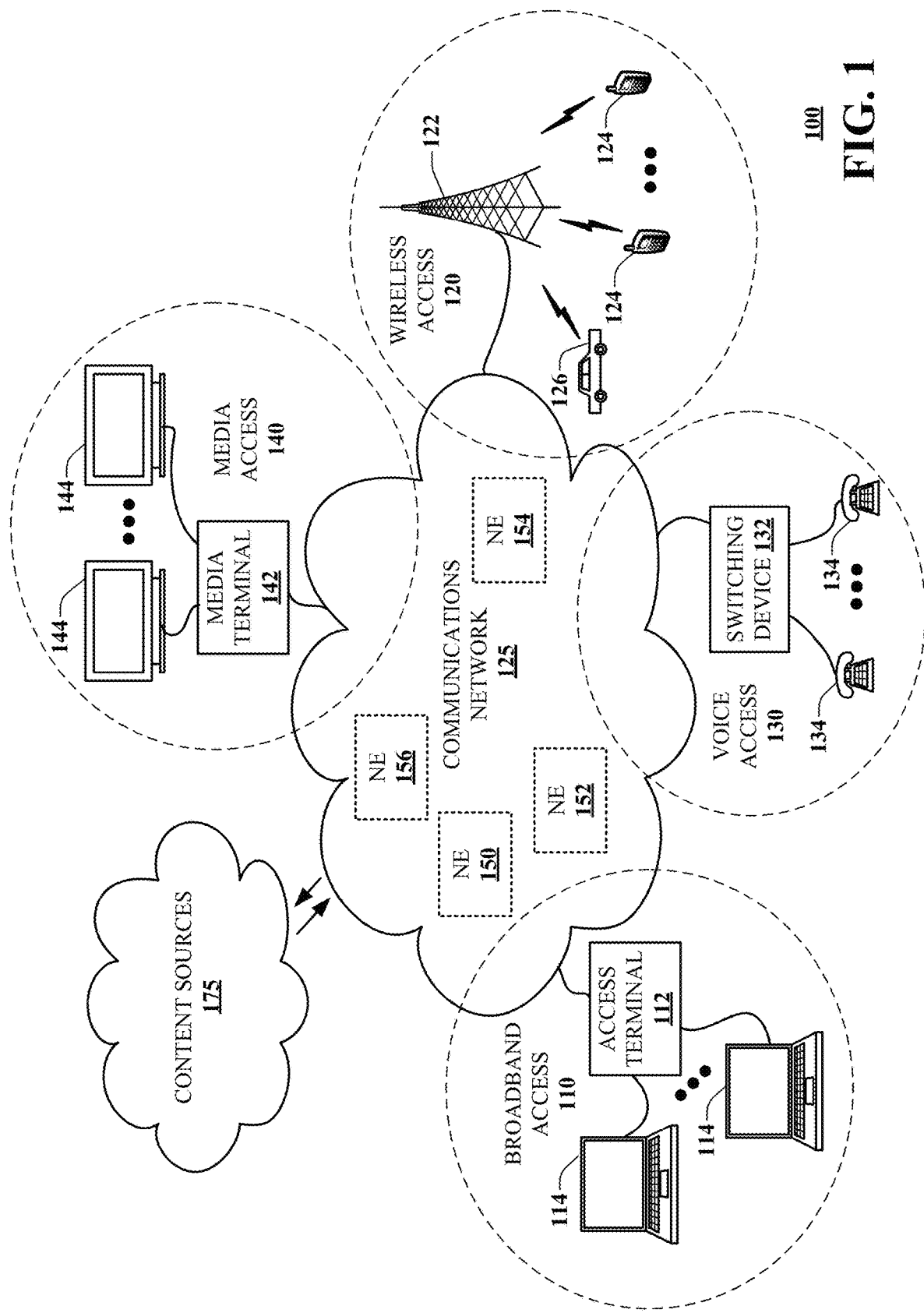
FIG. 1 is a block diagram illustrating an exemplary, non-limiting embodiment of a communications network in accordance with various aspects described herein.

The subject disclosure describes, among other things, illustrative embodiments for detecting and correcting undesired imbalance in delivery distribution of targeting information in online networked systems. Other embodiments are described in the subject disclosure.

One or more aspects of the subject disclosure includes a device receive, by the processing system, a message corresponding to an ad call from a web server requesting publication of one or more web pages and, in response, generating a current bid request for bids to respond to the ad call. The device may receive one or more bids to provide an advertisement in response to the current bid request. Each respective bid of the one or more bids is associated with a respective advertising campaign and comprises a respective bid value. The device may receive, information defining an attribute of interest for the ad call, the attribute of interest including a plurality of categories of values and including receiving information defining a respective probability for each respective value of the plurality of categories of values. The device may receive information about current values of the plurality of categories for the attribute of interest for each respective advertising campaign. The device may further determine a pacing value based on the respective probability for each respective value of the plurality of categories of values and the information about current values the plurality of categories for the attribute of interest. Further, the device may adjust a respective bid value produce an adjusted bid value by varying the respective bid value of the bid according to the pacing value. The device may further conduct an auction using the one or more bids and the adjusted value to select a bid to provide the advertisement in response to the current bid request, and communicate a message, by the processing system, to the web server, wherein communicating the message comprises communicating an advertisement corresponding to the selected bid.

The operations may further include determining an advertising attribute and a target delivery value for advertisements to be provided for an advertising campaign in a transaction management computing system. The operations may further include receiving a message corresponding to an ad call from a web server requesting publication of one or more web pages and deliver advertisements to the one or more web pages in response to the ad call. Delivering advertisements may include receiving a current bid request to provide a bid, determining one or more bids to provide an advertisement in response to the current bid request and selecting a winning bid from the one or more bids. The operations may further include monitoring a delivered value for the advertising attribute and determining that delivering advertisements includes an advertising skew. Determining the delivering advertisements includes an advertising skew may include comparing the delivered value for the advertising attribute and the target delivery value for the one or more advertisements. The operations may further include adjusting future advertisement delivery responsive to the advertising skew and including automatically adjusting future bid values to be provided in response to future bid requests to compensate for the advertising skew.

One or more aspects of the subject disclosure include a method including receiving a message from a web server requesting publication of one or more web pages, wherein the message includes an impression to be filled with an advertisement. The method may further include receiving information defining an attribute of interest for the impression, wherein the attribute of interest comprises a plurality of categories of values, and receiving information defining a respective probability for each respective value of the plurality of categories of values for the impression. The method may further include receiving information about current values of the plurality of categories for the attribute of interest for an ad campaign and determining a pacing value based on the respective probability for each respective value of the plurality of categories of values and the information about current values the plurality of categories for the attribute of interest. The method may further include adjusting a respective bid value of a bid to produce an adjusted bid value, for example by varying the respective bid value of the bid according to the pacing value. The method may further include conducting an auction using one or more bids and the adjusted bid value to select a bid to provide the advertisement in response to the current bid request and communicating a message to the web server. Communicating the message may include communicating an advertisement corresponding to the selected bid.

Referring now to FIG. 1, a block diagram is shown illustrating an example, non-limiting embodiment of a communications network 100 in accordance with various aspects described herein. For example, communications network 100 can facilitate in whole or in part an online content delivery system which conducts an auction among bids to serve an advertisement to a web page to fill an impression. The communication network 100 can implement a ratio pacing system to detect and compensate for unintentional bias or skew introduced in serving of content items. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. Media terminal 142 can include any type of user device such as a mobile phone or smart phone, a tablet, a laptop or desktop computer or connected television devices which can be connected to the internet and access content beyond what is available via the normal offering from a cable provider. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices. The display devices 144 can include connected television devices which can be connected to the internet and access content beyond what is available via the normal offering from a cable provider.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
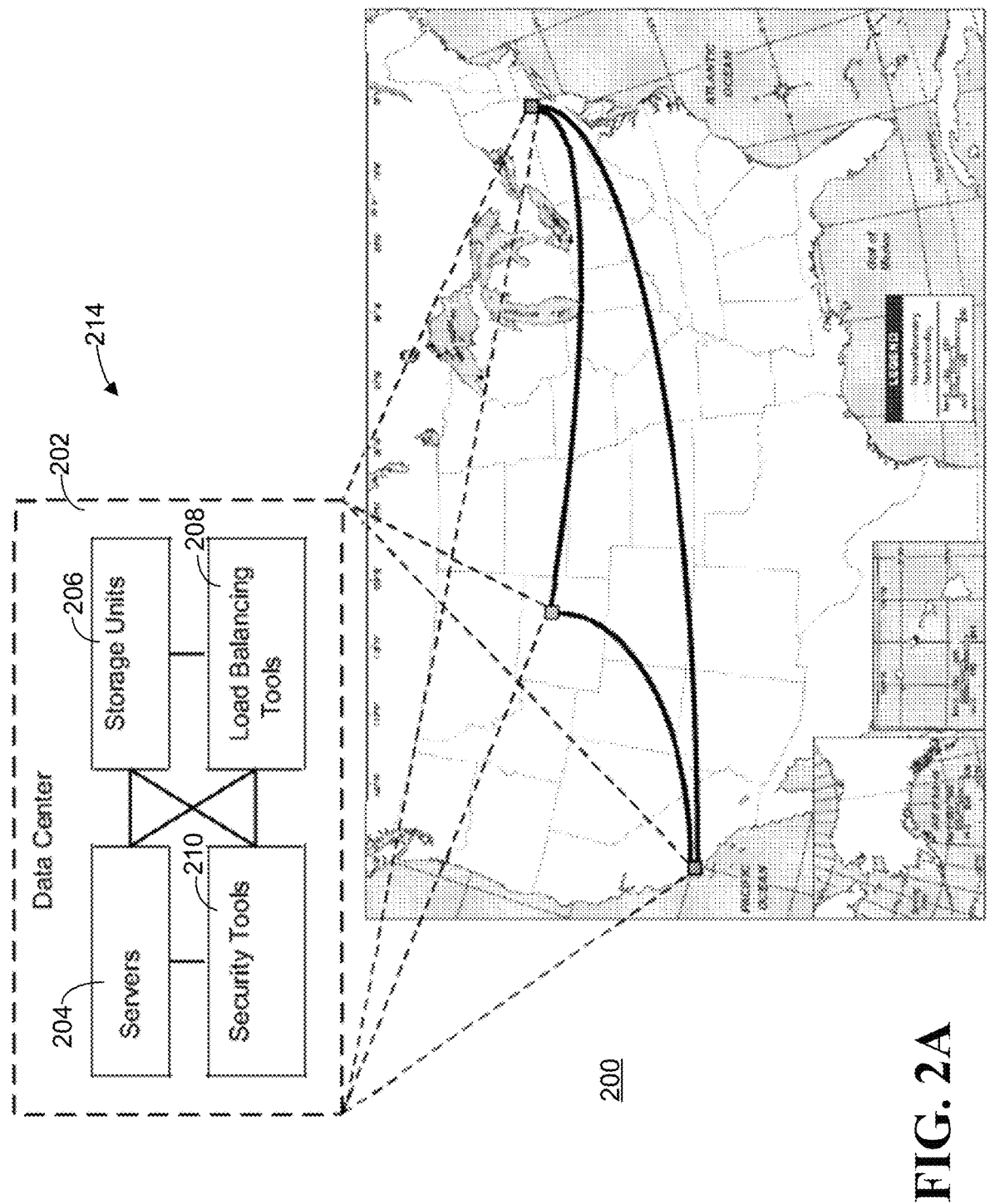
FIG. 2A is a block diagram illustrating an example, non-limiting embodiment of a system functioning within the communication network of FIG. 1 in accordance with various aspects described herein.

FIG. 2A is a block diagram illustrating an example, non-limiting embodiment of a system 200 functioning within the communications network 100 of FIG. 1 in accordance with various aspects described herein. The system 200 may be operable to facilitate in whole or in part an online content delivery system which conducts an auction among bids to serve an advertisement to a web page to fill an impression. The system 200 can implement a ratio pacing system to detect and compensate for unintentional bias or skew introduced in serving of content items.

FIG. 2A shows an exemplary embodiment of geographically dispersed multi-tenant enterprise data centers 202 that are connected via one or more communication backbone networks (illustratively depicted by the heavy black lines).

The communication backbone networks enable high-speed and high-volume data communications among the data centers. In an exemplary embodiment, a data center 202 generally includes a plurality of servers 204, storage units 206, load balancing tools 208 and security tools 211. The servers 204 generally receive data over one or more communication backbone networks, process data and provide data over one or more communication backbone networks. The data center 202 may host data processing and storage for one or more tenants who are given access to components such as the servers 204 and the storage units 206. The storage units 206 operate to store data for access by other components such as the servers. The load balancing tools may operate to manage traffic within a single data center 202 and between multiple data centers 202, and for routing data between users a preferred or fastest data center 202. The security tools 210 may operate to protect each tenant's data and privacy. Other resources including power, cooling and telecommunication-related resources (not shown) are also included in each data center 202. The data centers 202 may interact with other networks such as the public internet to communicate data with other equipment associated with the tenants, users of tenant networks and others as well.

An infrastructure computer system for an advertising platform may be hosted on one or more of the data centers 202. This infrastructure computer system may be referred to in some embodiments as an advertising platform 214. The advertising platform 214 may operate in an impression trading industry in which advertising creatives are matched with impressions, or spaces on web pages, video feeds and other locations that may be viewed by users. The advertising platform 214 may provide an ecosystem or network or cloud in which entities associated with an impression trading industry may collaborate and share industry-specific information without latency, bandwidth, and security issues that may be associated with the public Internet. The impression trading industry may connect for purposes of sharing information and commerce disparate parties such as users, a bidding provider, members, publishers and others. Such industry-specific information shared within the advertising platform may include information associated with one or more users, one or more bidding providers, one or more members, one or more publisher pages, prices, advertising creatives, or any suitable combination thereof.

The advertising platform 214 includes servers 204 of the data center 102 that have been provisioned and deployed by data center tenants using application programming interface (APIs) specific to the advertising platform 214. In general, each server 204 that is provisioned and deployed by a tenant is reserved for the exclusive use of that tenant. Doing so provides some measure of predictability with respect to available resources. Reservation of resources for exclusive use of a tenant provides security and privacy with respect to the tenant's data.

Various tenants of the data center 202 may assume different roles in the context of the impression trading industry. Tenants of the data center 202 may include advertising platform providers, impression selling members, impression buyer member, and bidders. Other tenants may be hosted as well.

An advertising platform provider is an entity which provisions and deploys one or more servers 204 of the data center 202 to function as a transaction management computing subsystem. A transaction management subsystem may also be referred to as a platform impression bus or simply Imp Bus. The Imp Bus facilitates the transaction aspects of impression inventory trading. In general, the Imp Bus processes ad requests, feeds data to members, conducts auctions, returns ads to the publishers, keeps track of billing and usage, returns auction-result data, and enforces quality standards.

An impression seller member is an entity that sells impression inventory. An impression seller member may be, for example, a publisher of a web site or a video game or other online resource. An impression seller member may provision and deploy one or more servers 204 of the data center 202 to function as a web delivery engine that accepts HTTP requests from web browsers operable by impression consumers. Such a web delivery engine may implement a variety of functions or features, such as authentication and authorization request, handling of static and dynamic content, content compression support, virtual hosting, large file support, and bandwidth throttling or management. Equipment of the impression seller member may provide other functions, as well.

An impression buyer member may be an entity that buys impression inventory. An impression buyer member may provision and deploy one or more servers 204 of the data center 202 to operate to serve advertising creatives or simply creatives. Creatives are data which define an advertisement adapted to fill an impression on a web page, in a video stream or in another location. In some instances, creatives are stored on a storage unit 206 within the data center 202, and the servers 204 of the impression buyer member will serve such creatives directly from the storage units 206 of the data center 202. In some instance, creatives are stored on an ad server or a content delivery network located on a server located remotely, outside of the data center 202. In such instance, the servers 204 of the impression buyer will facilitate the serving of creatives from the remote server. The entity may be an advertiser, an advertising network, an advertising agency, an advertising exchange, or a publisher.

To buy impression inventory, each impression buyer member engages a decisioning computing subsystem to operate on its behalf. Such a decisioning computing system may be referred to as a bidder. The term bidder generally refers to a computing system or other technological items rather than a person or entity that operates it. In a typical embodiment, a bidder includes a bidding engine that takes various pieces of bid-specific information as input and generates a bid for a particular item of impression inventory on behalf of an impression buyer member.

The advertising platform provides impression buyer members with a number of different bidder options. These include, for example, using a member-specific bidder. According to this option, the advertising platform provider provides a source code skeleton and allows an impression buyer partner to customize with priority information. In this case, the entity that buys impression inventory will further deploy a server 204 of the data center 202 to host a member-specific bidder for its exclusive use.

In another option, a hosted bidder is designed, built, hosted, and maintained by the advertising platform provider and allows each impression buyer member to simply upload bid guides or modify basic parameters, such as user data, recency, location, etc. In some instances, multiple impression buyer members use the hosted bidder.

In another option a bidding provider is an entity that provisions and deploys a server 204 of the data center 202 to operate a bidder on behalf of one or more impression buyer members with which it is contractually engaged. The bidder operable by the bidding provider generally includes a proprietary optimization bidding engine.

In some embodiments, tenants of the data center 202 may further assume additional or different roles than that described above. In some embodiments, the data center 202 and the advertising platform 214 may include other participants and tenants, in addition to those described above.

The advertising platform 214 also includes a cluster of high-performance storage units 206 of the data center 202. Data stored by a tenant on a storage unit 206 of the data center 202 may be accessed exclusively by that tenant or shared with other tenants within the data center if so configured. The types of data that may be stored include advertising tags or ad tags, reserve price information, advertising creatives, reserve creative information, cookie information, and market analysis information. Other information that may facilitate the trading of impression inventory within the advertising platform 214 may also be stored on storage units 206 of the data center 202.

The interactive nature of the Internet provides a number of advertising solutions that take advantage of the two-way communication and direct connections established between browser and content server for every user. Web pages, web-enabled video games, web-based broadcasts of multimedia programming, and web-enabled photo frames are just a few examples of the types of multimedia streams in which electronic advertisements may be injected. Traditionally, creatives, including still images and video advertisements, appear in ad spaces that are located within a web page, a video stream or other location. More recently, web-enabled video games have been coded to enable a creative to be dynamically loaded within an ad space of a game frame, such as in an image of a billboard on the side of a highway of a car racing game, or in signage appearing to be affixed to a roof of a taxi cab in a role playing game. Similarly, web-based broadcasts of multimedia programming, such as a live broadcast or on-demand replay of a sporting event, may be coded to enable a creative to be dynamically loaded within an ad space of a broadcast frame. Examples include an ad space behind home plate during the broadcast of the sporting event. A creative may be inserted within an ad space between broadcast frames, such as an ad space that coincides with a live commercial break. Web-enabled photo frames are generally configured to receive digital photos from photo sharing sites, RSS feeds, and social networking sites or other sources through wired or wireless communication links. Other electronic content, such as news, weather, sports, and financial data may also be displayed on the web-enabled photo frame.

Each of the multimedia stream types described above provides a host of creative serving opportunities. To facilitate the transaction of impression inventory on the advertising platform 214, an impression seller member such as a publisher of a web site or a video game may associate each creative serving opportunity with an ad tag. In general, an ad tag includes data or a data file that specifies information indicative of attributes of an ad space with which the ad tag is associated. In the case of an ad space within a web page, the ad tag may specify, for example, the language of the text displayed on the page; the nature of the content being displayed on the page, such as business, politics, entertainment, sports, and technology; the geographical focus, such as international, national, and local, of the web page content; the physical dimensions of the ad space; and the region of the page the ad space is located. In the case of an ad space within a web-enabled video game, the ad tag may specify the video game category, such as role playing, racing, sports, puzzle, and fighting; the age appropriateness of the video game, such as via an Entertainment Software Rating Board (ESRB) rating symbol, including for example, early childhood, everyone, everyone age 10 and over, mature, teen, and adults only; and the nature of the content being displayed within the game frame, such as via an Entertainment Software Rating Board (ESRB) content descriptor, such as alcohol reference, animated blood, crude humor, intense violence, language, mature humor, nudity, tobacco reference, and drug reference. In the case of an ad space within a web-based broadcast of multimedia programming, the ad tag may specify the language of the audio associated with the programming; the nature of the content associated with the programming, such as business, politics, entertainment, sports, and technology; the geographical focus of the programming; and the time of day the programming is being broadcast live or the time period in which the programming is available on demand. For example, ad providers might have a registration system on their supply and, therefore, they have deterministic access to their user's demographic information. Then, they could pass some or all user demographic information voluntary or by an agreement to the bidder to increase the value of their impressions.

In some implementations of the advertising platform 214, a platform-specific ad tag may be generated and associated with one or more ad spaces. In addition to the types of information described above, other types of information, such as a universal inventory identifier, a reserve price, and a list of approved universal advertiser identifiers, may also be associated with a platform-specific ad tag. The information associated with any given platform-specific ad tag may be specified server-side, such as tag_id=123&ad_profile_id=456, or maintained within the platform by a server-side mapping, such as when the Imp Bus maintains a server-side mapping of tag_id=123 to ad_profile_id=456. In the latter case, once an ad space has been tagged, information associated with the platform-specific ad tag may be easily modified by adding or otherwise changing the information within the platform without having to re-tag the ad space.

Each universal inventory identifier uniquely identifies a multimedia stream within the platform. As an example, a multimedia stream identified as large, such as the news website CNN.com may be divided into multiple multimedia streamlets such as CNN.com/entertainment, CNN.com/health, CNN.com/technology, and CNN.com/travel. In this example, each multimedia streamlet is assigned a universal inventory identifier within the platform. By contrast, a multimedia stream designated as small, such as the news website BostonHerald.com) may be assigned only one universal inventory identifier. The inclusion of a universal inventory identifier within a platform-specific ad tag enables bidders to refer to impression inventory associated with a particular multimedia stream in a common way. The size of the impression inventory associated with a multimedia stream is not the only factor in determining whether a multimedia stream is assigned one universal inventory identifier or multiple universal inventory identifiers. Other factors, such as the multimedia stream brand, may also be used. For example, a single universal inventory identifier may be assigned to a multimedia stream designated as large, such as web pages with a myspace.com domain name, based on its brand identity.

In some cases, a multimedia stream or some aspect of it includes impression inventory that is designated within the platform as direct inventory. In general, direct inventory refers to impression inventory that is part of a pre-existing media buy. Such a media buy is typically established by way of a contractual agreement between an impression seller member and an impression buyer member. The contractual agreement specifies the specific impression inventory that is subject to an exclusive first right of refusal on the part of the impression buyer member, and the reserve price that bidders other than the bidder operating on behalf of the impression buyer member must meet in order to take the impression inventory away. This process will be described in more detail below with respect to the exemplary use cases in the following section.

In some cases, a multimedia stream or some aspect of it includes impression inventory that may only be acquired by certain impression buyer members, or more specifically, impression buyer members that serve a specific brand of ad creatives. In such cases, a bidder performs an offline process that synchronizes creatives and/or brands that are approved or banned to run on the impression inventory with a specific ad profile ID that is subsequently passed along on the bid request.

Ad creatives for various campaigns may be stored in storage units 206 of the data center 202 that function as an ad server for an impression buyer partner or hosted on ad servers and content delivery networks outside of the platform.

In some implementations of the advertising platform 214, an impression buyer partner may be required to provide information that characterizes each ad creative that may be served responsive to ad calls from the platform and store such information within the platform. Such information may include attribute information that characterizes the type, dimensions, and content of the ad creative, and information that identifies a location where the ad creative can be retrieve, such as a redirect to a content delivery network. In other implementations of the advertising platform 214, it is merely recommended that such information be stored within the platform and therefore accessible by the bidder acting on behalf of the impression buyer partner with minimal latency during the real-time bidding process. In still other implementations of the advertising platform 214, the advertising platform provider itself looks at the creatives and supplies any of these attributes.

In some embodiments, the creatives that are served in response to ad calls from the advertising platform 214 conform to requirements, such as legality, decency, and common sense. For instance, creatives that promote gambling; depict libelous, violent, tasteless, hate, derogatory, or illegal content; portray partial or complete nudity, pornography, and/or adult themes or obscene content; are deceptive or purposely mislabeled; or spawn pops, simulate clicks, or contain malicious code, viruses, or executable files are generally not permitted.

Some publishers may prefer the creatives that are served to their inventory to comply with even more restrictive standards. For instance, such standards may be in place in order to maintain the reputation of the publisher's brand or to avoid promoting a rival. To simplify and speed the creative approval process for publishers, a list of preapproved creatives may be generated and maintained by a creative auditing computing subsystem on the advertising platform. When creating ad profiles, impression seller members can search for and/or elect to automatically approve creatives on this list, thus effectively outsourcing initial creative approval to a platform-based audit. For instance, the platform-based audit may review creatives for features such as having a meaningful and easily discernable brand or product offering; rotating images but not rotating brands or products; and having a brand on a platform-based list of approved brands. Additionally, the platform-based audit may prohibit creatives offering sweepstakes, giveaways, quizzes, surveys, or other brand-less games. If a brand is not discernable in a creative, it will not be approved and will run only on a member's exclusive inventory. Creatives that are modified after they have been audited will return to a pending status until they can be audited again. In some instances, advertisers may be charged a nominal fee in order to have their creatives audited.

Impression seller members such as publishers may also review and approve creatives on a case-by-case basis by creating an ad profile. A default ad profile may be created for a publisher. If no default ad profile is created for a publisher, all creatives may be allowed to run on the publisher's domain. In some embodiments, an ad profile includes three elements: members, brands, and creatives. Member- and brand-level approval standards can be used to reduce the number of creatives that need to be explicitly approved. For instance, when setting up the ad profile, a publisher may choose a designation such as trusted for members and brands that the publisher believes will always present acceptable ads. If a member or brand is marked or otherwise designated as trusted, all creatives of that member or brand may run by default, mitigating the need to audit each of that member's/brand's creatives. However, in some embodiments, the publisher or other seller member can override this default by reviewing the creatives and banning or otherwise designating individually any creatives of the trusted brand. The publisher may mark other members or brands as with a designation such as case-by-case, meaning that none of the creatives of that member or brand will run until explicitly approved by the publisher. The publisher may also designate or mark members or brands as banned, in which case none of the creatives of the banned member or brand will be shown. If a member or brand is banned, there is no ability to override the ban and approve a specific creative without knowing and searching for an individual creative identifier. In some instances, a separate ad profile may be created for each advertising campaign.

The ad profiles may be stored by the transaction management computing subsystem in an impression seller data store associated with the corresponding impression seller member. Ad profiles may further be updated or replaced in storage upon receipt of a new or updated profile.

For more granular control over quality standards, the publisher or other seller member may also be designated as approved or banned or otherwise at the level of individual creatives. To review specific creatives, the publisher can search for creatives using specific criteria. A preview of the creative will appear and the publisher selects whether to approve or ban the creative.

Similarly, in some embodiments, publishers or other seller members may be required to conform to stated standards of legality, decency, and common sense. For instance, publishers that embody any of the following characteristics may not be permitted to participate in the advertising platform: desktop applications, download accelerators, non-website based widgets and/or toolbars; gambling, including free, paid, or gateway to paid gambling; libelous, violent, tasteless, hate, defamatory, or illegal content; or nudity, pornography, and/or adult themes or obscene content; peer to peer, bit torrent, or other websites facilitating illegal file sharing; proxy sites facilitating anonymous web browsing; sites enabling or permitting illegal activities and/or copyright infringement; or Warez or mp3 downloads.

Inventory of impressions may be grouped into predefined lists such that bidder clients can make decisions about a large amount of inventory simply by knowing the group to which the inventory belongs. The site that each impression that passes through the Imp Bus belongs to is on a single class list. The list to which a particular site and its corresponding impression belongs is communicated along with the ad call to each bidder participating in an auction. Individual bidders are then free to make their own decisions about whether to bid on that impression.

Impressions may be grouped or categorized in any convenient manner. In one example, inventory may be designated or categorized as Class 1, Class 2, unaudited or Blacklist. In this example, Class 1 inventory has been audited by a platform-based auditor and represents many of the most popular publisher brands on the Internet. Each of the Uniform Resource Locators (URLs) on the Class 1 list has a minimum monthly volume, such as 100,000 impressions per month, and is certified to pass global inventory content standards. The Class 1 list is intended to be completely safe for any brand advertiser to purchase. Class 1 inventory does not contain sites that feature user-generated content or social media. Bidders accept Class 1 inventory by default.

Class 2 inventory in this example includes inventory that has been audited but does not meet the Class 1 volume or content criteria, but does meet the global inventory content standards. Social networking content may be included in Class 2 inventory. For instance, myspace.com, although a top publisher that by volume satisfies the Class 1 criteria, in this example is placed on the Class 2 list because it is designated as a social media web site. Bidders accept Class 2 inventory by default. If a bidder has chosen not to accept Class 2 inventory but also owns a Class 2 publisher, the bidder will receive its own Class 2 traffic.

All other inventory that passes through the Imp Bus is assigned the unaudited inventory label in this example. Sites remain categorized as unaudited until audited and assigned to another categorization. To ensure maximum advertiser brand protection, bidders by default do not accept unaudited inventory. However, a flag or other indicator can be set to enable acceptance of unaudited inventory if desired. In another example, if a bidder does not accept unaudited inventory but owns an unaudited publisher, the bidder will receive its own unaudited traffic.

Further in this example, inventory designated or contained in the Blacklist violates inventory content standards and has been prohibited. For example, prohibition may mean that impressions on the Blacklist will never reach the auction marketplace.

In some implementations of the advertising platform, a multi-tenant user data store is provisioned within the advertising platform 214 by a first user data store management component to enable members of the impression trading industry. The multi-data tenant store may also be referred to as a server-side user data store. The multi-data tenant store operates to synchronize user data information with a common set of platform-specific user identifiers, or user IDs.

In some embodiments, each platform-specific user ID of the server-side user data store is stored in association with data. Some of the stored may be specific to a particular impression consumer, such as data characterizing the impression consumer. In general, data that is stored in association with a platform-specific user ID may be supplemented and over the course of time as the impression consumer interacts with web pages and web delivery engines within the advertising platform 214.

In some implementations, all data stored in association with a platform-specific user ID may be shared between all tenants of the data center(s). In other implementations, mechanisms may be put in place to limit access to the data stored in association with a platform-specific user ID based on certain criteria. For example, certain impression trading industry members may have contractual agreements that specify exclusive sharing of data stored in association with a particular set or sets of platform-specific user IDs regardless of which web delivery engine a content request is directed to. In another example, an impression trading industry member may specify that all data stored in association with a particular set or sets of platform-specific user-ids may be shared with respect to a particular set of web delivery engines, some of which may be associated with other impression trading industry members.

In one specific implementation, user data information stored in association with a platform-specific user ID is formed by multiple segments of key-value pairs, where one or more key-value pairs may define each segment. Access permissions may be associated with one, some, or all of the segments to control which members access the user data information of respective segments. Accessing user data information may include reading, writing such data.

One issue that may arise following the serving of ads to a single impression consumer by impression seller partners located in geographically dispersed data centers is "synching collision." Synching collision occurs when multiple impression seller members attempt to simultaneously sync their user data information with a particular segment of key-value pairs that defines the user data information stored in association with a particular impression consumer's platform-specific user-id. This is best described with an example.

In the example, a user identified by user ID 12345 has two browser windows open, one pointing to a landing page of SiteAAA.com, which is hosted on a web server ("SiteAAA web server") located in New York City, N.Y., and the other pointing to a landing page of SiteBBB.com, which is hosted on a web server ("SiteBBB web server") located in San Jose, Calif. Each web server makes an ad call to the platform when the user 12345 navigates to respective pages of SiteAAA.com and SiteBBB.com, each of which includes at least one creative serving opportunity. This has the effect of causing the advertising platform to receive two impression requests for user 12345, one from the SiteAAA web server, which gets routed to the platform's New York City data center, and the other from the SiteBBB web server, which gets routed to the platform's Los Angeles, Calif. data center. Each of the platform's data centers includes a server-side user data store that has in it a variable global-frequency associated with user-id=12345.

Suppose, at time t=0, the global-frequency key-value pair of a user's impression frequency counter for user-id=12345 is "25". Traditionally with cookies, the global frequency is set to a fixed value. Synching collision occurs when two impression requests are received nearly simultaneously and a "set global-frequency to 26" notification is sent responsive to both impression requests. In other words, only one of the impression requests is logged in the user data store even though two are received. To avoid this situation, the advertising platform is implemented to send an "increment global frequency by 1" notification responsive each of the impression requests. Returning to the example above, the New York City data center will increment the global-frequency key-value pair for user-id=12345 to "26" to account for the ad call received from SiteAAA.com and transmit a message to the Los Angeles data center to apply the same logic; the Los Angeles data center will increment the global-frequency key-value pair for user-id=12345 to "27" to account for the ad call received from SiteBBB.com and transmit a message to the New York City data center to apply the same logic. In this manner, even though the messages are processed in different order on each site the final result is the same. That is, the global-frequency key-value pair for user-id=12345 goes from "25" to "27". User data store information is replicated consistently across multiple data centers.

In some embodiments, a portion of data storage of the data center 202 is designated as cookie space. Each bidder may be assigned a section of cookie space, known as a client-side user data store, in each user's browser. A bidder may freely push and pull data into or out of its own client-side user data store on each impression or pixel call. The data pushed into a particular bidder's client-side user data store is passed into requests for that bidder only, unless data contracts exist to allow the sharing of data with other bidders. However, when data is stored client-side by an advertiser outside of the user data store associated with the advertising platform provider, that data is inaccessible during an ad call, because the advertising platform domain, rather than the advertiser domain, is accessing the data forming the cookie. For this reason, data stored by the bidder is preferably stored synchronously in the client-side user data store by piggybacking a pixel call from the advertising platform.

In some implementations, user data is passed to the client-side user data store using a JavaScript Object Notation (JSON) mechanism. The advertising platform provider will execute a JavaScript function stored in each bidder's server-side context store and store the results in that bidder's section of the user's client-side user data store. Strings, integers, vectors, hash tables, and combinations of these may be stored and manipulated server side using a fully featured programming language such as JavaScript 1.8.1.

More particularly, a bidder's user data may be stored in the user's cookie as a JSON object. During a bid request, the JSON object is forwarded to the bidder. If no JSON object exists, an empty object "0" may be returned. The JSON object is parsed for reading using libraries provided by the advertising platform provider. Instead of creating a new JSON object to send back to the client-side user data store, a bidder includes in the bid response a call to a predefined JavaScript function stored in association with that bidder. The JavaScript function, which operates on a global variable containing the user data, is executed by the Imp Bus, and the results are stored in the client-side user data store. In some embodiments, the advertising platform provider may provide functions for use or customization.

For instance, a bidder may wish to track the number of times a creative has been shown to a particular user or the most recent time an ad was shown to that user. In response to receipt of a notification that a creative has been served, a predefined function provided by the advertising platform provider may enable frequency and recency variables associated with that user to be incremented.

In some embodiments, each data provider or bidder has its own scheme for internally identifying users. In order to enable integration between the bidder and the Imp Bus, the bidder-specific user ID for each user is mapped to the platform-specific user ID for the same user.

In general, the platform-specific user ID is stored in a client-side user data store, such as in a client-side browser cookie. The mapping between bidder user ID and platform-specific user ID may exist in the bidder's data store, the server-side cookie store of the advertising platform, or both. In some instances, the bidder's user IDs are stored within the bidder's reserved section of the client-side user data store. In this case, the bidder's user ID is included in each request the bidder receives from the Imp Bus, such as bid requests and pixel requests. In other instances, the mapping information is stored within the bidder's data store. In this case, when impression or pixel requests are received by the bidder related to a platform-specific user-id, the bidder looks up the mapping information in its own data stores.

Figure 2B:
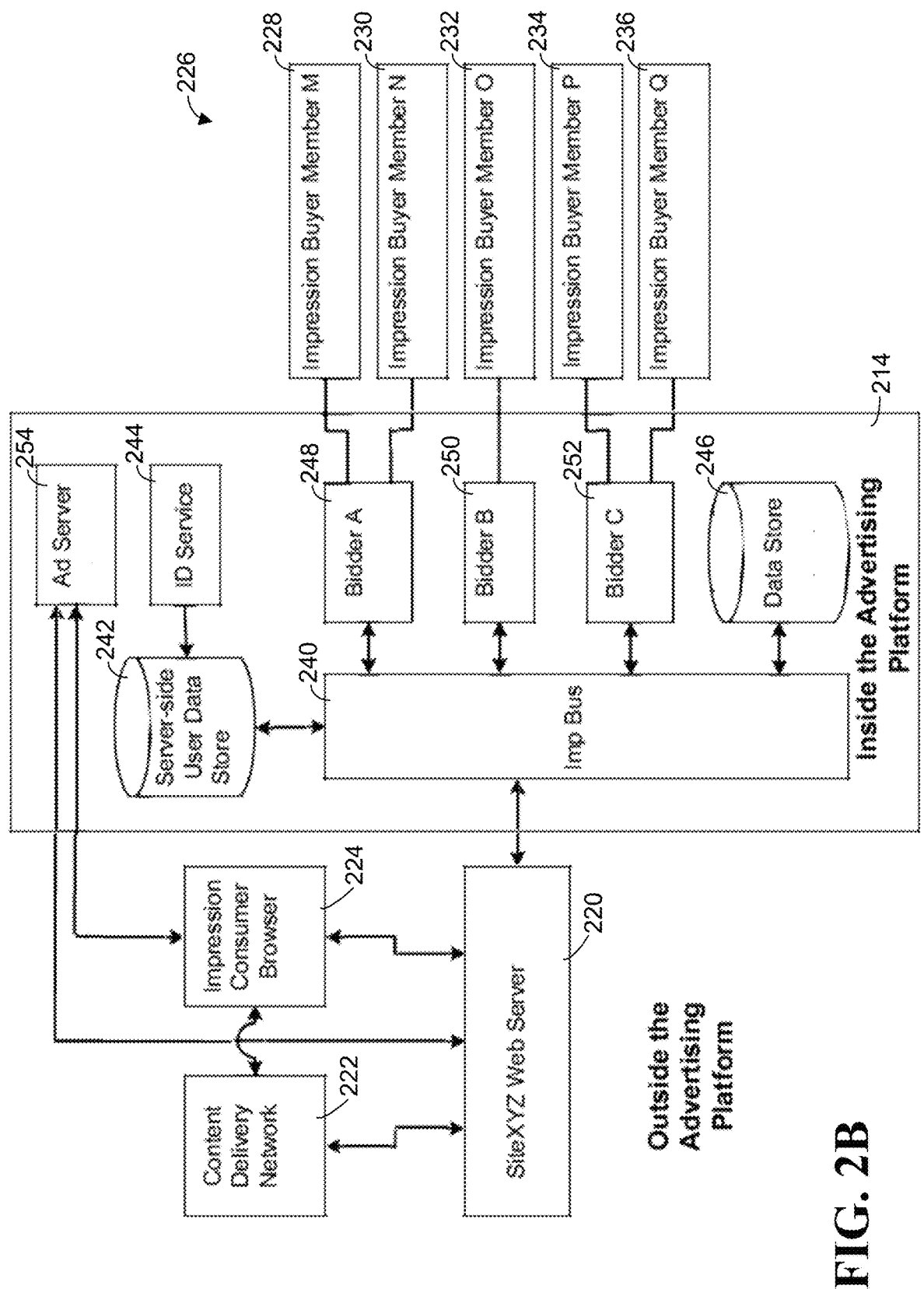
FIG. 2B is an example, non-limiting embodiment of an advertising platform functioning within the communication network of FIG. 1 in accordance with various aspects described herein.

FIG. 2B shows an exemplary embodiment of an advertising platform 214 that may be implemented, for example in a data center 202 of FIG. 1. For example, the advertising platform 214 can facilitate in whole or in part an online content delivery system which conducts an auction among bids to serve an advertisement to a web page to fill an impression. In some embodiments, the advertising platform 214 can implement a ratio pacing system to detect and compensate for unintentional bias or skew introduced in serving of content items. The advertising platform 214 is functionally illustrated in FIG. 2B in conjunction with external components including a web server 220 which implements a web site designated SiteXYZ, a content delivery network 222, a browser 224 of an impression consumer, and a plurality of impression buyer computer systems 226. The plurality of impression buyer computer systems includes system 228 associated with impression buyer member M, system 230 associated with impression buyer member N, system 232 associated with impression buyer member O, system 234 associated with impression buyer member P and system 236 associated with impression buyer member Q.

The advertising platform 214 includes an Imp Bus 240, a server-side user data store 242, an ID service 244, a data store 246, a plurality of bidders including bidder A 248, bidder B 250 and bidder C 252, and an ad server 254. The Imp Bus 240 or transaction management computing subsystem operates as a central control point of the advertising platform 214. The Imp Bus 240 receives creative serving opportunities such as ad calls from sources outside the advertising platform 214 including the SiteXYZ web server 220. The Imp Bus 240 generates a bid request that provides a multi-faceted characterization of each creative-serving opportunity of the requested page. The Imp Bus 240 communicates the bid request to each bidder 248, 250, 252 within the advertising platform 214. In response, the Imp Bus 240 receives one or more real-time bid responses on behalf of one or more impression buyer members 228, 230, 232, 234 236. with which the bidder 248, 250, 252 is associated. The Imp Bus 204 identifies a winning bid from among the bid responses returned by the bidders 248, 220, 252 and returns a URL that identifies a location of a creative of the winning bid to the SiteXYZ web server 202.

In exemplary embodiments, a bid request is generated by the Imp Bus 214 and generally includes information that characterizes the impression consumer or user. This information may include demographic information such as age, gender, income and race information, or geographic, psychographic and behavioral information for the user. This information may be based on data retrieved from the server-side cookie store of the server-side user data store 242, the ad space, and an auction identifier. This information may also be part of the ad call. The information about the ad space may be based on information associated with a platform-specific ad tag. In other embodiments, a bid request provided by the Imp Bus 240 to the bidders 248, 250, 252 may further include the following information:

a. Members: If included, a bidder may only consider the campaigns and creatives associated with impression buyer members having identifiers included in a Members array of information about identifiers for impression buyer members.
b. Userdata: The userdata attached to the user's cookie owned by the bidder receiving the request.
c. Frequency: The total number of impressions for this user across the advertising platform 214.
d. Clicks: The total number of clicks for this user across the advertising platform 214.
e. Recency: The number of minutes since the last impression for this user across the advertising platform 214.
f. Session Frequency: The number of impressions in a current session for this user.
g. Estimated Winning Bid Price: The price estimated to win the bid, based on predetermined and/or historical criteria.

A bid request can include all of this information, any combination of this information or additional information as well.

The SiteXYZ web server 220 interacts with the content delivery network 222 and the browser 224 of the impression consumer to receive and provide information. For example, the SiteXYZ web server 220 may receive a request for a web page from the content delivery network 222, the web browser 224, or both. In return, the SiteXYZ web server 220 proves the requested web page and other date to the content delivery network 222, the web browser 224, or both.

The impression consumer web browser 224 may operate in conjunction with user equipment such as a mobile device, cellular or wireless telephone, tablet computer, laptop or desktop computer, or any other equipment that can instantiate a web browser or provide access over a network to remote equipment such as the content delivery network 222, the SiteXYZ web server 220, and the ad server 254. The impression consumer web browser 224 may include a client-side user data store. The client-side user data store stores data locally, on the device of the web browser 224 or in conjunction with the web browser. This locally stored data may include cookies or other files and data which provide information about the impression consumer, or user, associated with the web browser, including demographic information about the impression consumer.

Demographic information may include the user's age, gender, preferences, purchase history, browsing history, identification, etc. The locally stored data may further include geographic information about current or past locations of the equipment associated with the web browser 224. Any other suitable information may be stored in conjunction with the web browser 224. Similarly, any stored information may be shared by application programs or apps on the user equipment or the web browser 224 with other equipment, including the advertising platform 214.

The server-side user data store 242 stores information related to one or more users who access the advertising platform 242. For example, the server-side data store 242 in some embodiments stores local copies of cookies and other information stored in the client-side user data store associated with the impression consumer web browser 224.

Each bidder 248, 250, 252 receives bid requests from the Imp Bus 240 in response to an impression or other advertising placement opportunity received at the advertising platform 214. The bid request includes information about the impression and invites the bidder, on behalf of one or more of the plurality 226 of impression buyer members, to develop a bid to respond to the impression. The response is in the form of a bid response provided to the Imp Bus 240. In some embodiments, a bid response includes information identifying, for example, a bid price and a creative that is to be served should the bid be identified as the winning bid of a platform-based auction.

In exemplary embodiments, a bid response typically includes a bid price and a creative that are to be served should the bid be identified as the winning bid of a platform-based auction. The actual creative may be supplied or, in the alternative, information identifying the creative or providing a location such as a URL or other network location where the creative can be found and retrieved. In other exemplary embodiments, a bid response provided by a bidder 248, 250, 252 to the Imp Bus 240 may further include the following information:

a. Member ID: This may be an identifier of the impression buyer member whose creative is chosen by the bidder 248, 250, 252 from a "Members" array of identifiers in the bid request.
b. Exclusive: This flag, which may have exemplary value of yes or no, may indicate to the Imp Bus 240 that the creative serving opportunity constitutes a pre-existing media buy and the creative provided in the bid response is to be served. No other bidders will be allowed to compete for the creative serving opportunity.
c. No bid: This flag, which may have exemplary value of yes or no, may indicate to the Imp Bus 240 that the bidder has returned a valid response but has chosen not to bid.
d. Price: The price, expressed as a cost per mille or thousand impressions (CPM), that the bidder is willing to pay for this impression. If exclusive, this is used only for reporting purposes; if not exclusive, this value may represent a reserve set by the bidder. Alternative pricing information may be provided, such as a cost-per-click (CPC) or cost-action (CPA), for example.
e. Userdata: Data to attach to the user, for example, by storing in association with the user's platform-specific user-id, if the bid response is selected as the winning bid.
f. Creative ID: Identification or location information of the advertising creative to be served if the bid response is selected as the winning bid.
g. Used Data Provider: In some embodiments, third-party data providers charge a fee when their information is used to target or optimize an ad. Contractually in such embodiments, bidders may be required to accurately report this by setting an appropriate flag in the bid response.

A bid response can include all of this information, any combination of this information or additional information as well.

The advertising platform 214 conducts an auction using bids to decide which ad creative will fill an ad call identifying an impression to be filled. The bid responses provided by the bidders 248, 250, 252 compete in an auction to determine which bid request is selected by the Imp Bus 214 for providing the creative in response to the impression or other advertising placement opportunity. The creative, or information about the creative, is provided, for example, to the SiteXYZ web server 220. In some embodiments, information about the creative selected in the auction by the Imp Bus 240 is used by the SiteXYZ web server 220 to access the creative in the ad server 254.

FIGS. 2C-2F illustrate several exemplary embodiments of operation of the advertising platform 214. In these exemplary embodiments, as in the exemplary embodiment of FIG. 2B, an impression seller member hosts a web site identified as SiteXYZ.com on a web server SiteXYZ web server 220. The web site provides a number of creative serving opportunities, each of which is associated with a platform-specific ad tag.

A request for a page of SiteXYZ.com that is generated by an impression consumer's web browser is received at step 256 by the SiteXYZ web server 202. If the requested page includes one or more creative serving opportunities, the web server 202 makes an ad call at step 258 to the advertising platform 214 by redirecting the page request to the Imp Bus 204. The Imp Bus 240 examines a browser header of the page request to determine if a platform-specific user ID is included therein.

The following sections illustrate a number of exemplary use cases following an ad call to the advertising platform 214. Actions taken by various actors or participants within the advertising platform 214 are tagged with respective reference numerals. To minimize the repetition of textual description, in the following sections cite a reference numeral may be cited as shorthand for an action that may be taken by an actor or participant within or outside the platform. The particular use cases illustrated, and the level of detail illustrated in each use case, are intended to be illustrative only and not exhaustive. Other use cases will be evident to those of ordinary skill in the relevant art.

Figure 2C:
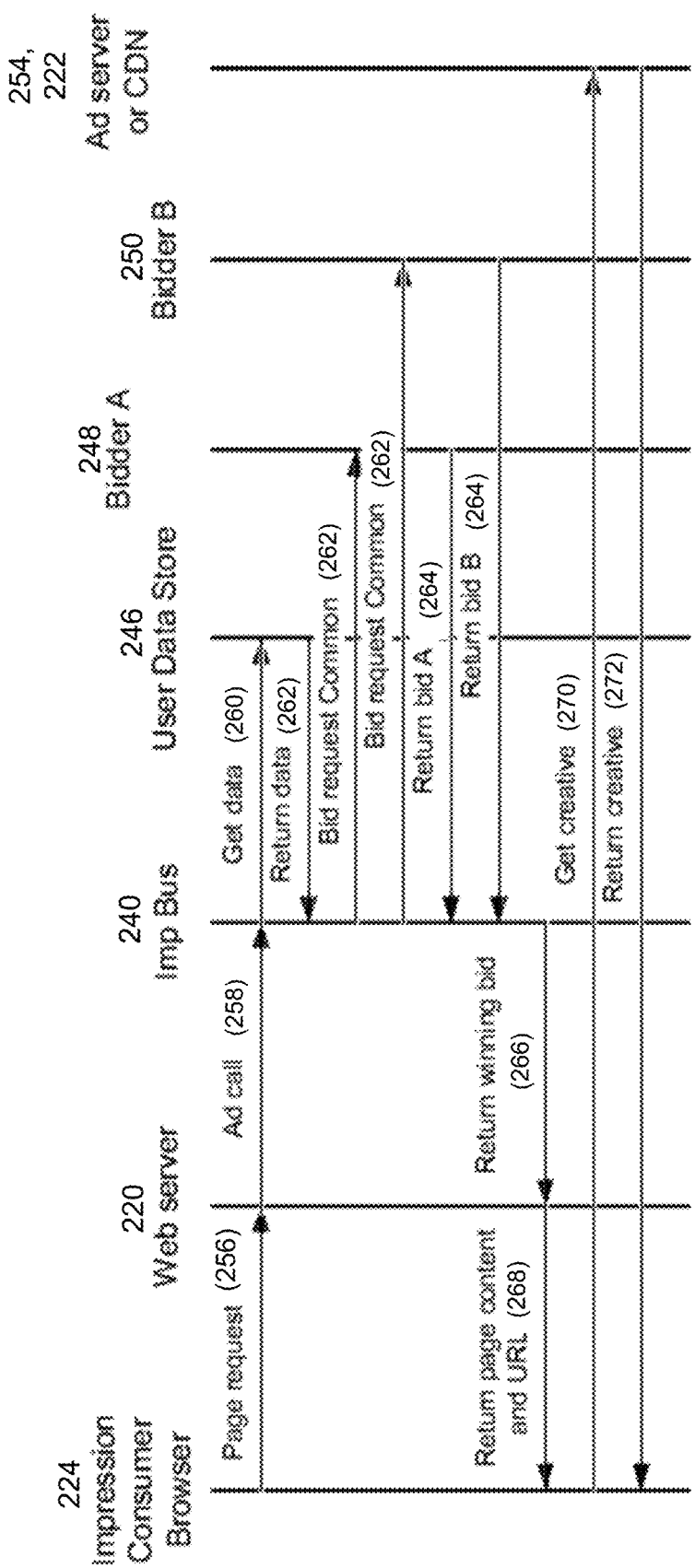
FIGS. 2C-2F illustrate several exemplary embodiments of operation of the advertising platform of FIG. 2B 1 in accordance with various aspects described herein.

FIG. 2C illustrates a first use case involving a known impression consumer, no restrictions on data sharing and an open platform-based auction. The ad call is provided from the server to the Imp Bus 240, step 258. The ad call is processed at the Imp Bus 240, for example by examining the contents of the ad call. If a platform-specific user identifier, such as User ID 1234, is found within a browser header of the ad call, the Imp Bus 240 determines the page request as originating from a known impression consumer. In response, the Imp Bus 240 retrieves at step 260 and step 262, from a server-side cookie store 246 within the advertising platform 214, data that has been stored in association with the platform-specific user-id.

Assume for this use case that none of the creative serving opportunities on the requested page is restricted. That is, assume the platform-specific ad tag does not specify a list of approved universal advertiser identifiers with respect to impression buyer members that may win an open platform-based auction to serve a creative. Further assume for this use case that data retrieved from the server-side cookie store 246 may be shared between impression trading industry members without constraints.

The Imp Bus 240, or transaction management computing subsystem, generates a bid request that provides a multi-faceted characterization of each creative-serving opportunity of the requested page. In some embodiments, there is a one-to-one correspondence between creative-serving opportunities and bid requests. That is, a bid request is generated for each ad tag associated with the requested page. In some embodiments, the multiple ad tags associated with the requested page are handled in a single bid request.

In general, a bid request includes information that characterizes the impression consumer. For example, the information included a bid request may be based on data retrieved from the server-side cookie store 246. Further, the information included in a bid request may include information that characterizes the ad space. For example, the information included in the bid request may be based on information associated with the platform-specific ad tag itself, such as data uniquely identifying the impression seller member, an impression inventory identifier, an impression inventory categorization identifier, or a universal impression inventory identifier; or data characterizing the impression, the impression seller member, the impression inventory source, or an impression inventory category. Still further, the information included in a bid request may include information forming an auction identifier. Because in this use case there are no constraints placed on the sharing of data between impression trading industry members, one bid request, labelled Bid request Common 264, in the drawing, may be generated and sent to all bidders 248, 250, 252.

The Imp Bus 240 sends, at step 262 the bid request to each bidder 248, 250, 252 within the advertising platform 214. The information included in the bid request is used, at least in part, by a bidding engine of each bidder 248, 250, 252 or a decisioning processor of a decisioning subsystem to generate a real-time bid response on behalf of an impression buyer member 228, 230, 232, 234, 236 with which the bidder 248, 25, 252 is associated. Respective impression buyer members 228, 230, 232, 234, 236 may return at step 264 the bid response to the Imp Bus 240. At a minimum, the bid response identifies a bid price, determined, for instance, using optimization techniques; and a creative that is to be served should the bid be identified as the winning bid of a platform-based auction. A bidder (e.g., Bidder A 248) may be associated with multiple impression buyer members (e.g., Impression Buyer Member M 228 and Impression Buyer Member N 230). In such instances, the respective bidding engines implemented by the respective bidders 248, 250, 252 may be operable to conduct an internal auction using bids of the respective bid requests to identify a winning bid from among the eligible campaigns of its associated impression buyer members, and to generate a bid response for the platform-based auction based conducted by the Imp Bus 214 on the result of the internal auction.

Following return of the bid responses at step 264 by the bidders 248, 250, 252 or decisioning subsystems to the Imp Bus 214 or transaction management computing subsystem, the Imp Bus 214 identifies a winning bid. This is done within a predetermined response time period such as a period measured in milliseconds. In most instances, the winning bid is the bid associated with the highest dollar value, and the best price for a creative serving opportunity is the price that yields the highest revenue for the impression seller member. In some embodiments, the winning bid and the best price are based on other metrics, such as ad frequency. In some embodiments, if the winning bid response is associated with an ad creative that has not been approved by the impression seller member, the second-ranked bid response is selected as the winning bid.

The Imp Bus 214 at step 266 returns information that identifies a location of a creative of the winning bid to the SiteXYZ web server 220. The identifying information may be, for example, a URL. In the depicted example, the SiteXYZ web server 220 returns, step 268, to the impression consumer's web browser 224, content forming the page requested at step 256. A tracking mechanism may be implemented to track presentation of the impression to the web browser 204. For example, the content forming the requested page may be embedded with an impression tracking mechanism that causes the impression consumer's web browser 224 to first point to the Imp Bus 214. This operates to allow the Imp Bus 214 to count the impression as served. Subsequently, the web browser 224 is redirected to cause the web browser 224 to retrieve, at step 270, step 272, the ad creative to be served from an ad server 254 within the advertising platform 214 or a server of a content delivery network 222. In another example, the SiteXYZ web server 220 returns to the impression consumer's web browser 224 the requested page, a first URL that points to the ad creative to be served, and a second URL that points to the Imp Bus 214 for use by the Imp Bus in counting the impression as served.

Figure 2D:
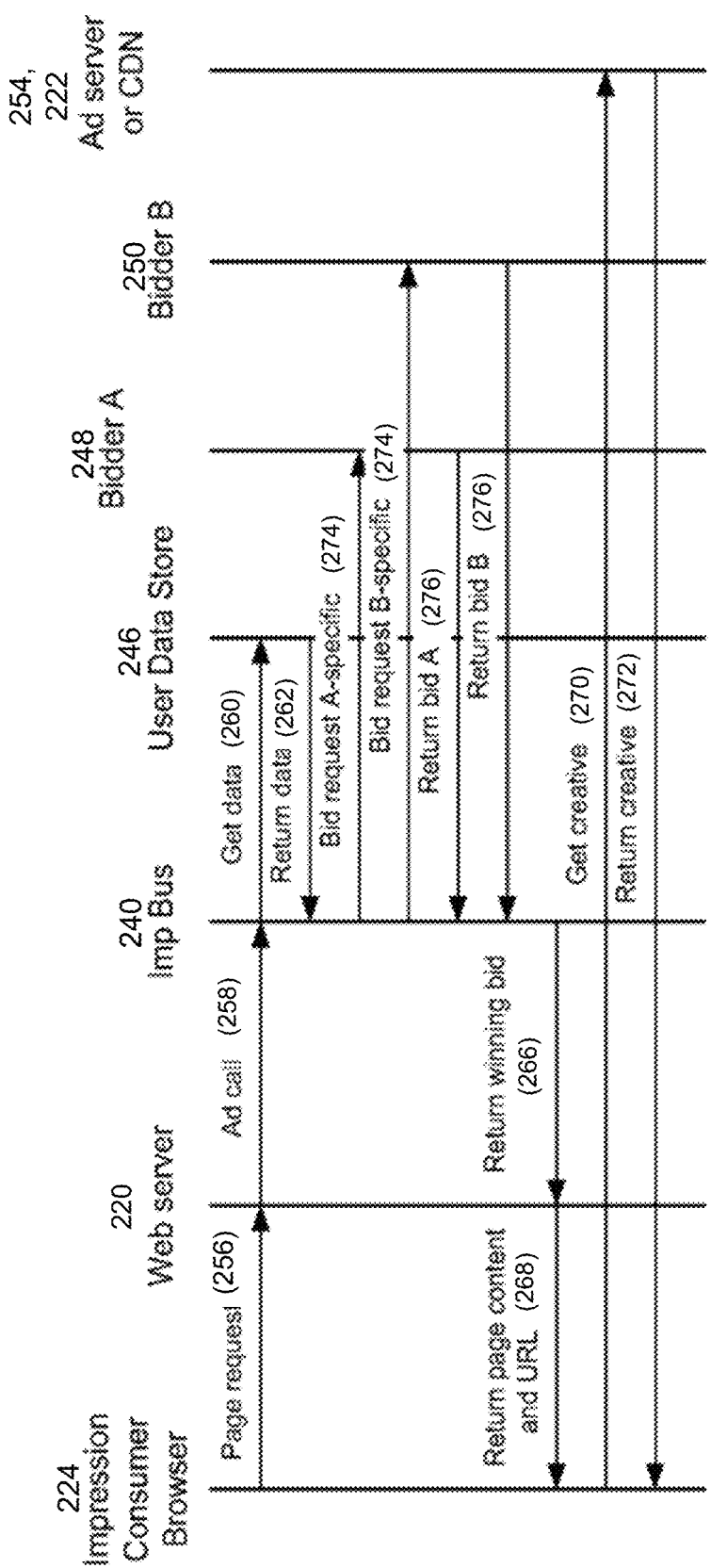

FIG. 2D illustrates a second use case involving a known impression consumer in a transaction with restrictions on data sharing in an open platform-based auction. As described above, the Imp Bus 240 receives the ad call, step 258, and fetches data from the user data store, step 260, step 262. In this use case, assume that restrictions have been placed on the sharing of data retrieved from the server-side cookie store 246 between some of the impression trading industry members. For each impression trading member, the Imp Bus 240 examines the restrictions to identify the subset of data retrieved from the server-side cookie store that may be shared with that impression trading member. For each creative serving opportunity of the requested page, the Imp Bus 240 generates an impression trading member-specific bid request. In the exemplary embodiment of FIG. 2C, these are labelled Bid request A-specific and Bid request B-specific. The specific bid requests provide a multi-faceted characterization of a creative serving opportunity. In general, the specific bid request of step 274 includes information that characterizes the impression consumer, the ad space and an auction identifier. The information that characterizes the impression consumer may include information based on the subset of data retrieved from the server-side cookie store that may be shared with that impression trading member. The information about the ad space may be based on information associated with the platform-specific ad tag itself.

At step 274, the Imp Bus 240 sends the appropriate bid request to each bidder 248, 250, 252 within the advertising platform 214. The advertising platform 214 acts on the bid requests in a manner similar to that described above. At step 276, the ad platform 214 returns bid responses to the Imp Bus 240. At step 266, the Imp Bus 240 conducts an auction and identifies a winning bid from among the bid responses returned at step 276 by the bidders 248, 250, 252. At step 268, the Imp Bus 240 returns a URL that identifies a location of a creative of the winning bid to the SiteXYZ web server 220. Step 268, step 270 and step 272 are performed as described above to effect the delivery of an ad creative.

Figure 2E:
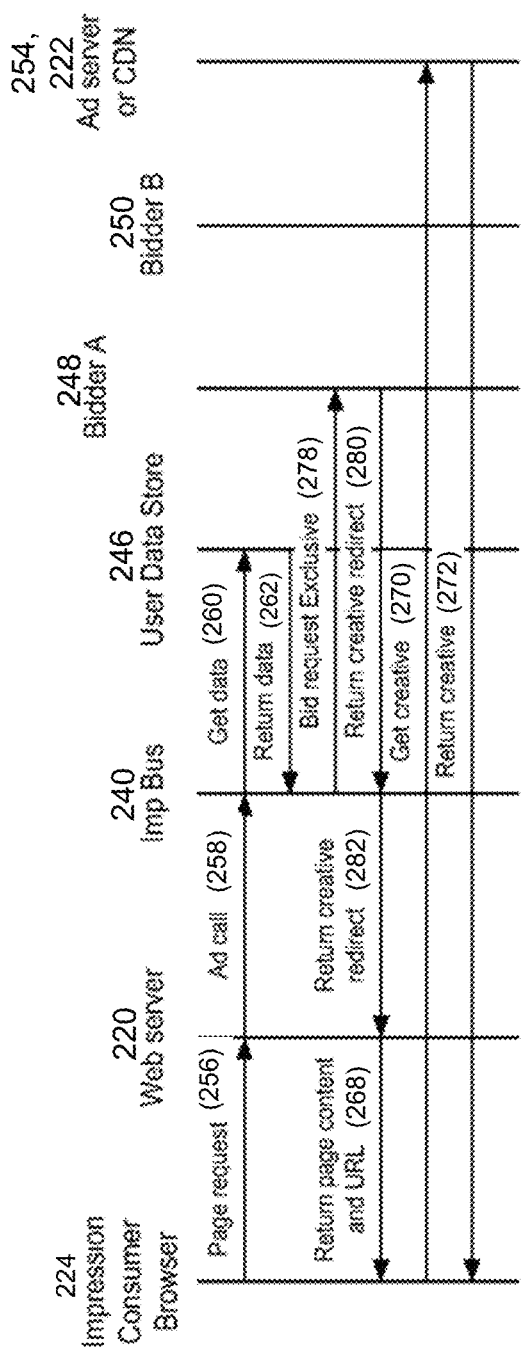

FIG. 2E illustrates a third use case involving a known high value impression consumer and no platform-based auction. This use case may occur when an impression buyer member has purchased a media buy giving exclusive access to a particular market, keyword or other portion of the advertising space. In this example, Impression Buyer Member O 232 has purchased an exclusive media buy.

As described above, the Imp Bus 240 receives the ad call, step 258, and fetches data from the user data store, step 260, step 262. The Imp Bus 240 examines each platform-specific ad tag found within the browser header of the ad call to determine whether the corresponding creative serving opportunity on the requested page is part of a particular impression buyer member's pre-existing media buy. For each creative serving opportunity on the requested page that is part of an impression buyer member's pre-existing media buy, the Imp Bus 240 generates a bid request-exclusive that provides a multi-faceted characterization of that creative serving opportunity. At step 278, the Imp Bus 240 sends the bid request-exclusive to a bidder such as Bidder B 250 in the illustrated example. The bidder, Bidder B 250, operates within the advertising platform 214 on behalf of that particular impression buyer member, in this example, Impression Buyer Member O 232.

The bidder, bidder A 248, that receives the bid request examines the information that characterizes the impression consumer to determine the value of the impression consumer to the impression buyer member, in this example, Impression Buyer Member O 232. Impression Buyer Member O 232 is the impression buyer for whom the creative serving opportunity constitutes a pre-existing media buy. If the value of the impression consumer exceeds a predetermined threshold, the bidder (in this example, bidder A 248) selects a creative from a campaign associated with the impression buyer member, Impression Buyer Member O 232, for whom the creative serving opportunity constitutes a pre-existing media buy, and returns, step 280 to the Imp Bus 240 a redirect identifying the location of the selected creative. The Imp Bus 240 sends at step 282 this redirect to the SiteXYZ web server 220. Step 268, step 270 and step 272 are performed as described above to effect the delivery of an ad creative.

Figure 2F:
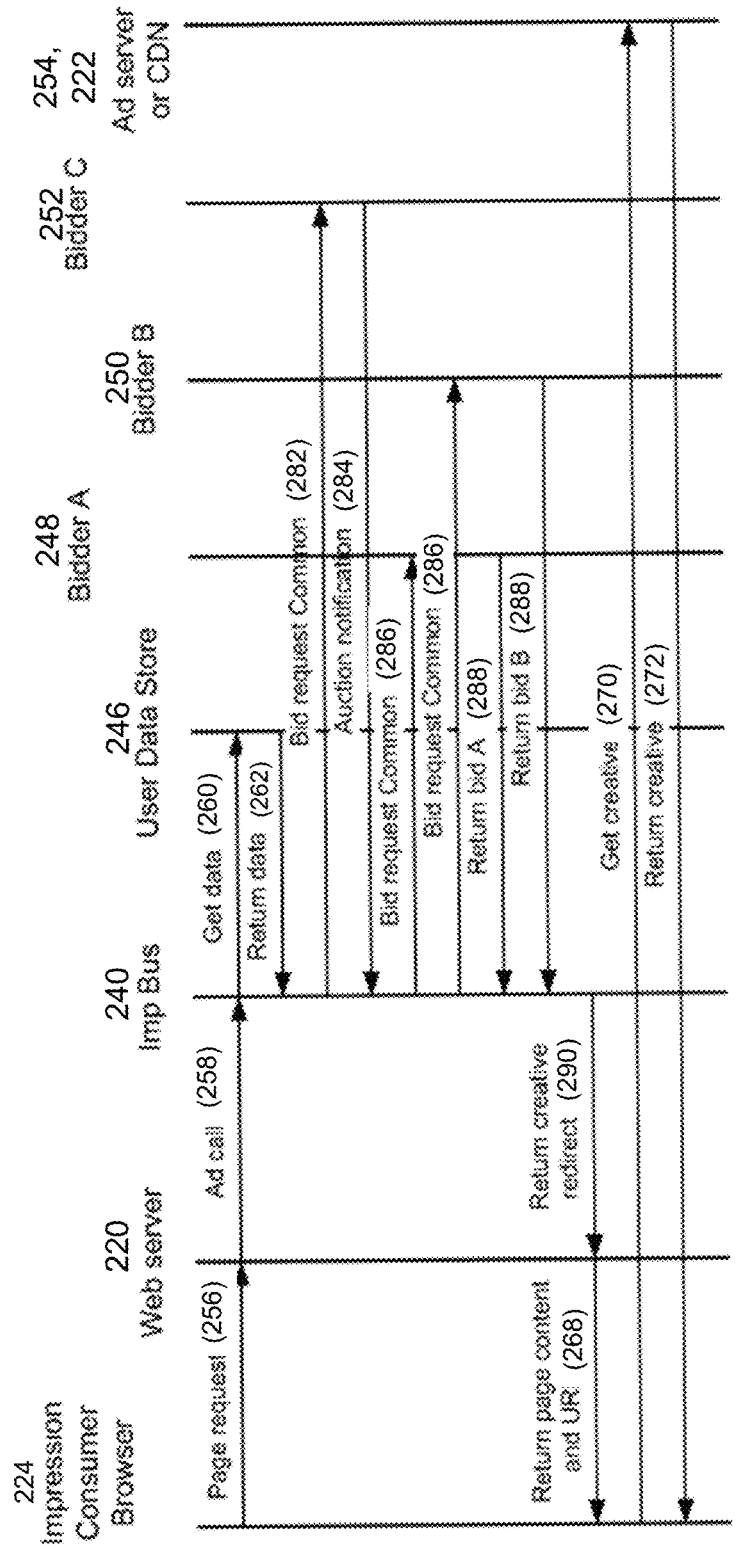

FIG. 2F illustrates an alternative use case involving a known low value impression consumer, no restrictions on data sharing and a constrained platform-based auction. In FIG. 2F, the Buyer member Q 236 has made a pre-existing exclusive media buy. As described above, the Imp Bus 240 receives the ad call, step 258, and fetches data from the user data store, step 260, step 262. In this example, data retrieved from the server-side cookie store 246 may be shared between impression trading industry members without constraints.

The Imp Bus 240 examines each platform-specific ad tag found within the browser header of the ad call received at step 258 to determine whether the corresponding creative serving opportunity on the requested page is part of a particular impression buyer member's pre-existing media buy. For each creative serving opportunity on the requested page that is part of an impression buyer member's pre-existing media buy, the Imp Bus 240 generates a bid request, designated as a Bid request Common in FIG. 2F, that provides a multi-faceted characterization of that creative serving opportunity and at step 282 directs that bid request to the bidder. In the exemplary embodiment of FIG. 2F, the bid request is directed to Bidder C 252. Bidder C 252 is operating on behalf of a particular impression buyer member, in this example, Impression Buyer Member Q 236. In general, the bid request sent at step 282 includes information that characterizes the impression consumer, the ad space and an auction identifier. The information that characterizes the impression consumer may be based on data retrieved from the server-side cookie store. The information that characterizes the ad space may be based on information associated with the platform-specific ad tag itself.

The bidder (in this example, Bidder C 252) that receives the bid request examines the information that characterizes the impression consumer to determine the value of the impression consumer to the impression buyer member, Impression Buyer Member Q 236 for whom the creative serving opportunity constitutes a pre-existing media buy. If the value of the impression consumer does not exceed a predetermined threshold, the bidder returns at step 284 to the Imp Bus 240 an auction notification. In one example, the auction redirect includes a redirect that identifies a location of a reserve creative and a reserve price that other bidders must meet in order to take the creative serving opportunity away from the impression buyer member, Impression Buyer Member Q 236 for whom the creative serving opportunity constitutes a pre-existing media buy.

Because in this exemplary use case, there are no constraints placed on the sharing of data between impression trading industry members, the Imp Bus 240 may send at step 286 the previously-generated bid request, to each of the other bidders, in this example, Bidder A 248 and Bidder B 250, within the advertising platform 214. At step 286, the Bid request Common is now considered a secondary bid request. Each of Bidder A 248 and Bidder B 250 examines the information that characterizes the impression consumer to determine the value of the impression consumer to its associated impression buyer members. In this example, Bidder A 248 is associated with Impression Buyer Member M 228 and Bidder B 250 is associated with Impression Buyer Member O 234. In some embodiments, each of Bidder A 248 and Bidder B 250 generates a bid response to be returned at step 288 to the Imp Bus 240.

The Imp Bus 240 first eliminates from contention those bid responses having a bid price that fails to meet or exceed a reserve price included in the auction notification received at step 284. If all of the returned bid responses are eliminated, the Imp Bus 240 sends at step 290 the redirect that was included in the auction notification to the SiteXYZ web server 202. If, however, at least one of the returned bid responses meets or exceeds the reserve price included in the auction notification, the Imp Bus 240 performs an auction, identifies a winning bid, and returns at step 290 to the SiteXYZ web server 220 a redirect that identifies a location of a creative of the winning bid. Steps 268, 270, 272 are performed as described above to effect the delivery of an ad creative.

In one example, the impression buyer member Impression Buyer Member Q 236 corresponds to an advertising agency and the creative serving opportunity on the requested page is part of the impression buyer member's pre-existing media buy for a first advertiser or advertising network that engaged the advertising agency. The advertising agency may choose to have its bidder, Bidder C 252, conduct an internal auction to identify a winning bid among the eligible campaigns of the other advertisers and advertising networks associated with the advertising agency in those instances in which the value of the impression consumer to the first advertiser or advertising network does not exceed a predetermined threshold. Only if the winning bid resulting from the internal auction does not meet a reserve price set by the first advertiser or advertising network for that creative serving opportunity does the bidder, Bidder C 252, return to the Imp Bus 240 an auction notification as described above.

At the conclusion of a platform-based auction, the Imp Bus 240 may generate a result notification for each bidder 248, 250, 252 that submitted a bid response responsive to a bid request. The information included in a result notification may vary depending upon implementation and circumstance. Examples of such information include the following:

a. Auction ID: An auction identifier that uniquely identifies this particular auction from among all of the platform-based auctions that have taken place within the platform.
  b. Transaction ID: A transaction identifier that uniquely identifies a transaction in the auction.
  c. Valid Bid: This flag, which may be binary and set to either yes or no, reports to the bidder the receipt of a valid bid response.
  d. No Bid: This flag, which may be binary and set to either yes or no, reports to the bidder the receipt of a no-bid response.
  e. Impression Won: This parameter notifies the bidder as to whether its bid response resulted in a winning auction and impression served.
  f. Impression Won/Deferred: This parameter notifies the bidder that its bid response resulted in a winning auction but serving of its impression is being deferred.
  g. Winning Price: This value represents the bid price that won the auction. In some implementations, this parameter is excluded if the reserve price specified by the impression seller member is not met.
  h. Bid Price: This value represents the bid price submitted by the bidder in this particular auction.
  i. Estimated Winning Bid Price: This value represents a price that was estimated to win this particular auction, based on predetermined and/or historical bid data.
  j. Member ID: This value identifies the impression buyer member for whom the bidder operated on behalf of in this particular auction. Typically, this value is provided to the Imp Bus in the bidder's bid response.
  k. Bidder ID: This value identifies the bidder used in this particular auction.
  l. Response Time: When provided, this value represents the number of milliseconds that elapsed between the sending of a bid request to a bidder and the receipt of a bid response from that bidder. This parameter is excluded if no bid response is received by the Imp Bus.
  m. Revenue Generated: This value represents revenue generated by the sale of an impression.
  n. Impression Consumer: This parameter reports information associated with the impression consumer or the impression consumer's web browser.
  o. Impression Consumer's Response: This parameter reports information associated with the impression consumer's response to a creative that was served.
  p. Impression: This parameter reports information associated with the impression or advertising space.
  q. Creative: This parameter represents or characterizes the creative selected to be served.
  r. Ad Tag: This parameter includes information associated with the ad tag.
  s. Third-party ID: This parameter identifies any third-party data providers that contributed data towards the generation of a bid response.

The result notification may include other, additional or less information, depending on a particular embodiment, implementation or use case. The result notification maybe presented or communicated in any suitable fashion, such as a message with a number of designated, formatted fields for each item of information. The information provided in the result notification may be used by a bidder 248, 250, 252 or decisioning subsystem to fine tune or otherwise modify its bidding strategy to better position itself to win future platform-based auctions. Suppose, for example, that a bidder consistently loses a platform-based auction with a bid of $2.00 for a car buyer on a particular website such as nytimes.com/autos. By examining the Winning Price information provided in the result notification, the bidder may adjust a future bid price to maximize its potential to win such a platform-based auction without overpaying for the impression. Similarly, by examining the Response Time information provided in the result notification, the bidder may determine that its bid response is being received outside of the predetermined response time period set by the Imp Bus 240 and adjust its bidding algorithm to accelerate the rate at which its bid response is generated and returned to the Imp Bus 240. Such adjustments may be made automatically after receipt and processing of the result notification, or manually by a campaign manager, or a combination of these.

A bidder can also pass to the Imp Bus 240 or transaction management computing subsystem additional information such as a user ID, a user frequency, a campaign ID, or others, to be passed back to the same bidder during a result notification. This additional information can also be useful to the bidder or to the impression buyer member to manipulate bidding strategy or to understand the results of an ad campaign.

From the advertising platform provider's standpoint, there are advantages to preventing impression trading industry members from obtaining detailed information about any one particular impression consumer or creative serving opportunities within the platform. For example, this minimizes the potential for an impression trading industry member to sign up to transact on the platform for a short period of time simply for the purposes of obtaining detailed information about impression consumers and quitting after a sufficient amount of detailed information has been obtained. To that end, the Imp Bus 240 may be configured to filter the information that is passed between the various impression trading industry members during the course of transaction platform-based auctions.

The use case illustrated in FIG. 2D illustrated a scenario in which restrictions have been placed on the sharing of data retrieved from the server-side cookie store between some of the impression trading industry members. In this use case, for each impression trading member, the Imp Bus 240 examines the restrictions to identify the subset of data retrieved from the server-side cookie store 242 that may be shared with that impression trading member. The Imp Bus 240 generates an impression trading member-specific bid request that includes information that characterizes the impression consumer. The information may be based on the subset of data retrieved from the server-side cookie store that may be shared with that impression trading member, for example.

In an alternative embodiment, the Imp Bus 240 or transaction management computing subsystem may also filter the information that is retrieved from the cookie store. In one embodiment, the Imp Bus 240 analyzes the entirety of the data retrieved from the server-side user data store 242 or user data store 246 and provides a somewhat abstracted version of the retrieved data in each impression trading member-specific bid request.

In one example, the retrieved data includes information about the impression consumer's gender, age, zip code, income, and behavioral data. Also in this example, bidder A 248 previously pushed information into the server-side user data store 242 to identify this particular impression consumer's gender (gender=male), income (income=$138,000), and behavioral data (behavioral data=likes fishing, likes hunting) only; bidder B 250 previously pushed information into the cookie store to identify this particular impression consumer's age (age=28), zip code (zip code=02130), and behavioral data (behavioral data=buys ski gear) only; bidder C 252 has never pushed information into the cookie store with respect to this impression consumer. Other information in the user data store 246 may have been provided by a third-party data provider, an impression buyer member, and/or an impression seller member.

The respective bid requests generated by the Imp Bus 240 may be tailored to the data provided by each respective bidder. For bidder A 248, the Imp Bus 240 may generate an impression trading member-specific bid request that includes gender=male, age=25-35; zip code=North East USA; income=$138,000, and behavioral data=likes fishing, likes hunting, likes winter sports. For bidder B 250, the Imp Bus 240 may generate an impression trading member-specific bid request that includes gender=male, age=28; zip code=02130; income=$100,000-$199,999, and behavioral data=likes outdoor sports, buys ski gear. For bidder C 252, the Imp Bus 240 may generate an impression trading member-specific bid request that includes gender=male, age=25-35; zip code=North East USA; income=$100,000-$199,999, and behavioral data=likes outdoor sports, likes winter sports. Each bidder is provided detailed information that it has itself pushed to the cookie store via a feedback mechanism through the platform but is only provided an abstracted version of the remaining information that is retrieved from the cookie store.

In addition to providing an abstracted version of the data retrieved from the cookie store, the Imp Bus 240 may also provide an abstracted characterization of the creative serving opportunity. For example, in lieu of specifying the URL of the page being requested (e.g., lodgeatvail.rockresorts.com/info/rr.gcchalet.asp) by the impression consumer's web browser, the Imp Bus 240 may simply provide in the bid request an identifier of a category of the page and site, such as high-end ski resort. More generally, the Imp Bus 240 may provide data characterizing an impression, an impression seller member, an impression inventory source, and/or an impression inventory category. In some embodiments, the Imp Bus 240 sends a data retrieval request to an inventory management subsystem operable to manage impression inventory information across multiple impression inventory sources. One example of a scenario in which it is advantageous to obfuscate the creative serving opportunity is as follows. A publisher has a sales force that is tasked with identifying impression buyer members with which to establish a contractual relationship that defines a media buy. An impression buyer member that is aware of the opportunity to obtain this publisher's impression inventory at a lower price through platform-based auctions may choose to bypass the publisher's sales force altogether and take its chances on the open market. This has the effect of reducing the number of media buys that are established between the publisher and the impression buyer member and/or altering the financial worth of the media buy from the publisher's perspective.

In some embodiments, the Imp Bus 240 may provide data uniquely identifying the creative serving opportunity, including data uniquely identifying an impression seller member, an impression inventory identifier, an impression inventory categorization identifier, a universal impression inventory identifier, and/or a universal resource locator.

Figure 3A:
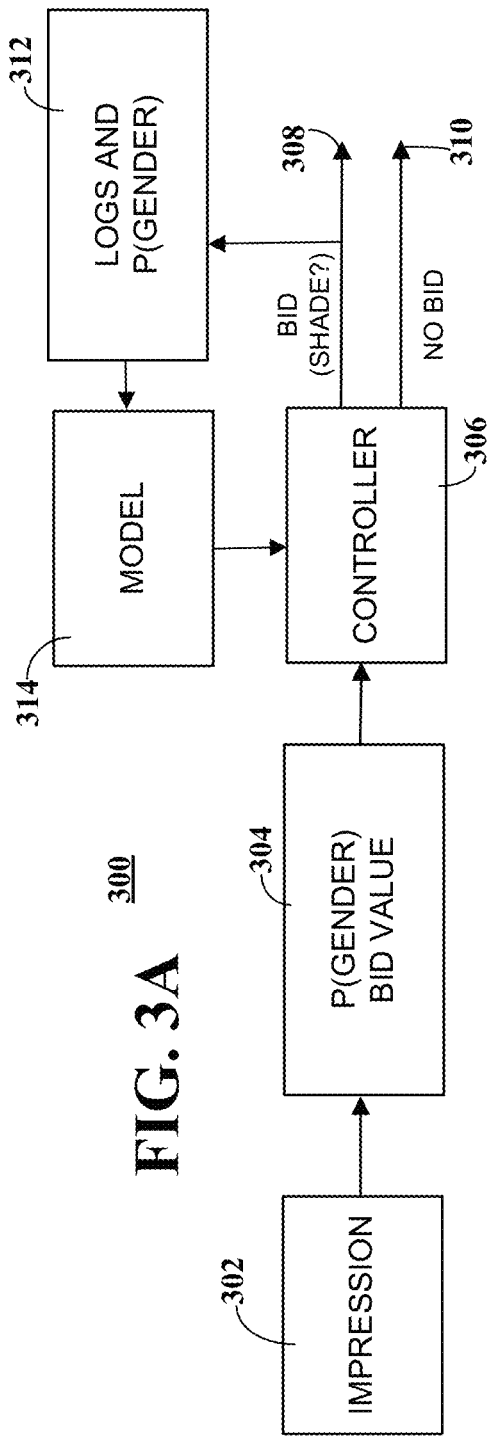
FIG. 3A is a block diagram of a bid shading system for managing advertisement delivery for an online advertising campaign.

FIG. 3A is a block diagram of a system 300 for managing advertisement delivery for an online advertising campaign. An advertising campaign may be characterized by, for example, a campaign identifier, one or more keywords, advertising text, an advertiser identifier, a landing page identifier such as a uniform resource locator (URL), a campaign budget, campaign timing information, etc. In one particular application, FIG. 3A is a block diagram of an embodiment of a bid shading system 300. The system 300 has particular application for detecting variations in ad delivery from targets specified by campaign managers, advertisers, advertising agencies, advertising networks and others. For convenience, these will be referred to herein collectively as campaign managers.

A campaign manager or other person associated with an advertising campaign may establish advertising delivery and targeting goals for a campaign being managed by an advertising platform. The targeting goals may specify features of particular interest about an audience intended to see the campaign manager's advertisements. Such targeting goals may specify demographic information, geographic information, psychographic information and behavioral information about an audience. Demographic information includes a viewer's age, gender, income, marital status, etc. Geographic information includes features such as a viewer's location or residence. Psychographic information explains a viewer's hobbies, spending habits, values, etc. Behavioral information including information about brand response, how viewers make purchasing decisions, etc. The campaign manager may use tools to set targeting goals according to these and other categories and the advertising platform will operate to automatically serve ads to viewers to best achieve the targeting goals.

After a campaign is under way and the platform is operating automatically, a skew or bias in ad delivery may develop. A campaign manager's targeting goals for an ad campaign are intended to achieve predetermined business goals of the advertiser, such as increasing sales of a product or service among a market segment or increasing brand awareness among a market segment. The actual delivery of advertisements to an audience may vary from the targeting goal of the campaign manager. For example, an ad campaign targeted to viewers with an interest in men's dress pants will cause viewers to see advertisements for such products. A percentage of those viewers will respond to the advertisements by viewing the advertisements, clicking on the advertisements or taking some further action with respect to the advertisements. After a time, because of the nature of the audience targeted, the number of advertisements served may have a skew or bias in the audience that has viewed the advertisements. For example, ads for men's dress pants may be more likely to be responded to by men than women. After a period of time, the audience that has viewed such ads may have an intentional or unintentional bias towards male viewers This may be undesirable to some campaign managers, who prefer to maintain a balance in the gender of the viewing audience. This bias or skew may be invisible to the campaign managers.

The advertising platform in accordance with the present disclosure operates according to the campaign manager's targeting goals to optimize a particular targeting goal, such as serving ads primarily to viewers most likely to respond to the advertisement. But while successfully optimizing for that targeting goal, a bias may be introduced. In the example above, the bias or skew that is introduced may be characterized as showing the ad to too many men, or too few women.

This represents a technological problem. Many campaign managers require monitoring and control over the audience for their ads. A degree of control is provided through the advertising delivery and targeting goals for a campaign. However, those are generally set at the beginning of the campaign with limited opportunities for adjustment during the duration of the campaign. Moreover, the bias or skew that is introduced may be undetected using conventional systems. This bias or skew is due to the nature of the bidding, the nature of the products or service which are the subject of the campaign, and the nature of the audience viewing and responding to advertisements. In the example of a campaign for men's dress pants, the campaign manager and the advertising platform may have no way of detecting the bias that is introduced in the form of too many male viewers or too few female viewers. The demographic skew may be invisible, even after completion of the campaign. Accordingly, there is a need for an automated system that can detect and automatically compensate for a skew or bias in viewer characteristics that arises during the life of a campaign. The system and method must operate substantially in real time to analyze a bidding opportunity, generate a bid for participation in an auction to fill an impression on a web page being loaded on a user's device in an amount of time generally indistinguishable to the user.

FIG. 3A illustrates an exemplary embodiment of a bid shading system 300 in accordance with various aspects described herein. The bid shading system 300 in this example embodiment includes a bidding function 304 which receives an impression 302, a controller 306, bid output 308, no bid output 310, storage logs 312 and a model 314. Other embodiments may include more or fewer features or components than those shown in FIG. 3A.

The bid shading system 300 operates to determine if a bid should be generated in response to an ad call or impression 302. Further, the bid shading system 300 operates to determine if the bid should be shaded or adjusted to a higher or lower amount for a given advertising campaign. The system may choose to shade the bid in order to adjust or compensate for a skewed or biased targeting goal of the advertising campaign. The advertising campaign may be identified by a campaign identifier. The advertising platform which implements the bid shading system 300 stores campaign data according to the campaign identifier. The stored campaign data may include any data pertinent to the campaign, such as targeting goals of the campaign manager, information about bids received and winning bids, information about all impressions filled and the impression consumers who see advertisements, statistical data, etc. In the example of FIG. 2B, the campaign data may be stored, for example, in data store 246.

An impression 302 is received at the bidding function 304. For example, when a web page is viewed by a browser of a device of a user, an ad call is received. The ad call identifies an impression on the web page to be filled. In the example of FIG. 2B the ad call is received from the web server 220 by the Imp Bus 240. In response to the ad call, the Imp Bus 240 generates an ad request for one or more bidders 248, 250, 252, 254. The ad call may include information about the impression consumer or user who viewed the web page. The information may include demographic, geographic, psychographic and behavioral information, for example, in a cookie file or other device. Further, the information could be numeric, categorical, or encoded in some manner. Still further, the information could be deterministic or probabilistic in nature. The bid request may include some or all of this information, and respective bid request information may be tailored to respective bidders. The bidders 248, 250, 252, 254 operate as described herein to determine if and how much to bid on the impression. The information about the ad call is contained in the impression 302. Thus, for example, the impression 302 includes the information that the person responsible for the current impression or ad call, the viewer, is male or female. Alternatively, the information may be probabilistic, expressing a probability that the viewer associated with the ad call or impression is a male, such 80% likely to be male.

The bidding function 304 may be implemented by one or more bidders 248, 250, 252, 254 shown in FIG. 2B. Alternatively, the bidding function 304 may be implemented by any other suitable component or party participating in the bid shading system 300. The bidding function 304 may be implemented in hardware, software or any suitable combination. The bidding function 304 has access to various data about the impression consumer who initiated the impression 302 or ad call.

The bidding function 304 determines the probability that the impression may match a targeting goal. In the illustrated example, the gender of the viewer is the targeting goal of interest. The gender targeting goal may be set at any suitable value by, for example a campaign manager. For example, the bid shading system 300 may seek to keep the gender ratio, or the ratio of male and female viewers at 1.0, or approximately fifty percent each, with some permitted tolerance. In other examples, the gender ratio may be set at seventy percent women to thirty percent men, or sixty percent men to forty percent women.

Gender ratio is used in the illustrated example, However, any other suitable demographic, geographic, psychographic or behavioral characteristic could be used instead or in addition, or other characteristics could be used as well. For this present example, gender is the characteristic of interest. While the discussion here focuses on a male-female or m-f binary gender example, the system and method may be readily extended to non-binary gen355 der examples as well including for example, m-f-x. The bidding function produces a probability about the gender of the impression consumer associated with the current impression being processed or the viewer who has requested to view a web page that generated an ad call. The bidding function 304 may not be able to determine with complete certainty the gender of the individual that is the source of the current ad call. Therefore, a gender probability p(gender) is produced from available information.

In other examples, other characteristics may be monitored and adjusted, and such characteristics may have more than a binary value like male and female. For example, demographic information for an audience segment may include income information, where income is defined in bands from $0 to $50,000; $50,000 to $100,000; $100,000 to $200,000; $200,000 to $500,000; and above $500,000. The structures and functions illustrated herein may be readily adapted to a characteristic such as income having more than two possible values. Moreover, the structures and functions herein may be further adapted to a multi-dimensional system which implements bid shading for more than a single variable. Such a multi-dimensional system may monitor both the gender and the income level of impression consumers. Based on historical information for an ad campaign, the bid shading system may develop bid recommendations and bid shading values to optimize delivery of ads to achieve desired gender ratios and income bands.

The bidding function 304 determined the probability that the viewer is a specified gender, male or female. Further, the bidding function 304 determines a bid value to return, for example, to the Imp Bus 240 for participating in an auction by the Imp Bus 240 to fill the impression. The determined bid value is passed to the controller 306.

The controller 306 operates to determine if a bid should be submitted to the auction or not, and, if a bid is submitted, whether the bid should be shaded or not. A bid is shaded when the bid value is adjusted upward or downward to compensate for a perceived bias in the audience that has viewed advertisements for the current advertising campaign. The controller 306 produces a bidding indication at outputs 308, 310 of the controller 306. Any suitable bidding indication may be produced. In the example of FIG. 3A, the controller 306 produces at a bid output 308 an indication that a bid should be produced, an indication that the bid should be shaded, and a shading amount. Further in the example of FIG. 3A, the controller 306 produces at a bid output 320 an indication that no bid should be produced.

The result of the decision produced by the controller 306 may be stored in storage logs 312 for subsequent use by with model 314. The storage logs 314 may store, for example, past information about the past impressions such as probability that an impression was received from a male or female, or any other characteristic. The illustration of the controller 306 with outputs 308, 310 in FIG. 3A is intended to be primarily conceptual to illustrate the processes implemented by one or more data processing systems, for example of an advertising platform such as the advertising platform 214 of FIG. 2B. The bid or no bid decision produced by the controller 306, as well as a shading and shading amount decision, are intended to automatically correct for a bias or skew detected by the controller in data for the current advertising campaign.

The controller 306 has access to a model 314. In one example embodiment, the model 314 receives as input a campaign identifier which uniquely identifies the current campaign as well as the gender probability p(gender) received from the bidding function 304. The model 314 produces as an output information about which decision to make, bid or no bid, and if bid, whether to shade or not to shade. The model 314 operates on historical data. In one embodiment, the model retrieves data from, for example, data store 246 of the advertising platform 214 of FIG. 2B. Further in some examples, the model 314 uses historical data from a predetermined time period. In one example, the predetermined time period is the immediately preceding two weeks. Other examples of longer or shorter duration may be used. For example, historical data can be retrieved from the starting date of the current campaign. Moreover, for purposes of privacy and confidentially, data used by the model 314 and the controller 306 are used solely by the model 314 and the controller 306. Those data are preferably not shared with any other components of the advertising platform. The data many be anonymized or abstracted or otherwise made secure so that information about users or impression consumers or advertisers or impression buyers is not made otherwise available. This is true of the model 314 itself, as the model is trained over time based on historical data.

The model 314 may produce a bid shading value. The value may be a real number that can serve as a multiplier to another value to control or manage bidding on the current impression. In one example, the bid shading value is a number greater than or less than 1.0 that may be multiplied by the bid value produced by the bidding function 304 and provided to the controller 306. For example, the model 314 may produce a bid shading value of 0.90 or ninety percent. This would be an appropriate value if the model determines that excessive ads have been served to the bid consumer or web page viewer associated with the current impression being processed. The excess ads served represents a skew or bias in the serving of ads. There is a time domain component in that too many ads have been served to date to viewers with this viewer's characteristics. In the present example, if the viewer is male and too many ads have been served to date during the present campaign, based on the historical data from a predetermined time period, a bid shading value less than 1.0 is appropriate to, in effect, slow down the serving of additional ads to more male viewers.

In contrast, the model 314 may produce a bid shading value of 1.20 or one hundred twenty percent. This would operate as a multiplier to the bid value produced by the bidding function 304. This would be an appropriate value if the model determines that insufficient ads have been served to the bid consumer or web page viewer associated with the current impression being processed, based on a characteristic such as gender of the current bid consumer. If not enough women have viewed ads for the current campaign, and the gender probability p(gender) indicates this viewer is likely female, the model 314 may produce a bid shading value of 1.20. This would operate to speed up serving ads to more women, including the current viewer, and to thereby compensate for the bias introduced in the serving of advertisements to date.

Some embodiments may use an additional parameter X that is introduced to stop bid shading from going too far and not overspend all the budget on a few bids. X may be a maximum permitted bid shading value, for example. It may be set to a static value or be determined dynamically. In this case, bid shading is defined as a minimum value between ρ(bid shading value) and the value X.

The model is implemented as a set of instructions and data that may be processed on a data processing system. The instructions may be stored any convenient locations, such as the data store 246 of the advertising platform. Similarly, the data may be stored in any convenient location, either locally or at a location available over a network. The instructions and data may be processed by any suitable data processing system including a processor.

Figure 3B:
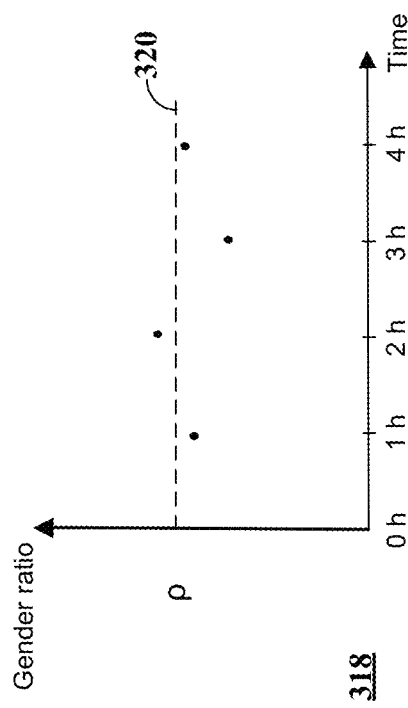
FIG. 3B is an exemplary performance curve for the bid shading system of FIG. 3A.

FIG. 3B is an exemplary curve 318 for the bid shading system 300 of FIG. 3A. FIG. 3B shows time on the abscissa and a desired gender ratio ρ 320 and actual gender ratio on the ordinate. The gender ratio corresponds to a ratio of males to females (or females to males) viewing an advertisement. The desired gender ratio 320, illustrated by the dashed line and letter p in FIG. 3B, may be received by the bid shading system 300 as an input from a campaign manager, for example.

The desired gender ratio 320 serves as a targeting goal for the bid shading system 300. The desired gender ratio may serve as a fairness ratio. Any user characteristic, including demographic, geographic, psychographic or behavioral or other characteristics may establish a fairness ratio. Fairness may not be a one-to-one ratio but may be determined based on particular goals of the advertising campaign. Fairness is viewed from the perspective of the impression buyer or advertiser. For example, the advertiser might be advertising to fill an available job. If the job is one that is traditionally or locally most commonly filled by males, and the advertiser wishes to recruit females and males equally, the fairness ratio may be adjusted by the advertiser to favor showing the job advertisement to more female job seekers than male job seekers to control the audience viewing the advertisement. This addresses a technological problem that can be inadvertently introduced by the nature of the viewing audience and the nature of the product or service advertised. The impression buyer or advertiser can adjust the fairness ratio provided as an input to the bid shading system 300 and the bid shading system will automatically compensate for the bias that is inadvertently introduced, including when the advertiser is aware of the bias in ad serving.

The model 314 of the controller 306 of the bid shading system 306 receives or has access to historical data for advertisements served during the duration of the advertising campaign. This includes information about impressions received including the impression 302, results of auctions that have been conducted to serve impressions, etc. The controller 306 can calculate or measure an actual gender ratio using the historical data. Calculated or measured actual gender ratios are illustrated as dots in FIG. 3B. For example, one hour after the campaign is initiated, the actual gender ratio is below the desired gender ratio 320. Two hours after initiation of the campaign, the actual gender ratio is above the desired gender ratio 320. Three hours after initiation of the campaign, the actual gender ratio is below the desired gender ratio 320. Four hours after initiation of the campaign, the actual gender ratio is slightly below the desired gender ratio 320. As time elapses during an advertising campaign, the bid shading system 300 seeks to match the actual gender ratio, calculated at that time, for advertisements already served, to the desired gender ratio 320. If the controller 306 determines that the actual gender ratio is below the desired gender ratio 320 at a time point, the controller 306 will produce a bid decision at the output 308 in FIG. 3A along with a bid shading value greater than 1 to effectively speed up the serving of ads to impression consumers like the current impression consumer. On the other hand, if the controller 306 determines that the current actual gender ratio is above the desired gender ratio 320 at a time point, the controller 306 will produce a bid decision at the output 308 in FIG. 3A along with a bid shading value less than 1 to effectively slow down the serving of ads to impression consumers like the current impression consumer.

While FIG. 3B shows determining the actual gender ratio on an hourly basis, any time increment may be used, including variable time increments. The bid shading process operates like an automatic accelerator or automatic brake to manage the serving of advertisements in the campaign to optimize a goal of a campaign manager. This may affect delivery of advertisements in the campaign. Moreover, some embodiments may provide for optimization for a number of values of plurality or characteristics of an audience An example might combine the audience age demographic and audience geography. Any other combination of audience features could be processed together and bid shading could be used to adjust ad delivery accordingly. In the illustrated example of FIG. 3B, since a single characteristic, gender, is used, the curve 318 for the bid shading system 300 is one dimensional with time. In embodiments using more characteristics, the curve would be multidimensional.

The system 300 of FIG. 3A implements a ratio pacing system for maintaining a predetermined ratio of a specified characteristic, such as gender of viewers of advertisements. The system 300 operates to return a value for adjusting a proposed by produced by one of bidder A 248, bidder B 250 and bidder C 252 of FIG. 2B. The system knows the details of the current impression 302, including characteristics of the viewer such as the viewers gender. The system determines a current gender ratio for the bidder relative to a desired gender ratio ρ 320 and produces a bid shading factor or bid adjustment factor.

For example, consider an example where the current gender ratio for ads served during the course of the campaign is relatively low for females, meaning the campaign is biased low for female viewers. That is, the current gender ratio as a function of time is below the desired gender ratio ρ 320 represented by the line in FIG. 3B. Further in this example, the current impression being considered for a bid by a bidder 248, 250, 252 is for a female viewer. In that example, to remove the bias that has developed in the gender ratio, the system 300 will produce a bid shading factor greater than 1.0. This will be multiplied by the bid produced by the bidder 248, 250, 252 to produce an adjusted bid amount. The adjusted bid amount will then be used in the auction among all bidders 248, 250, 252. Because the adjusted bid amount is increased relative to the bid produced by the bidder, the likelihood is increased of winning the auction and serving the ad to the current impression, identified as a female viewer. This will tend to reduce the apparent bias or to remove the skew in ad serving.

In a similar example, where the current gender ratio for ads served during the course of the campaign is again relatively low for females, meaning the campaign shows a bias or skew that is low for females, and the current impression 302 is a male viewer. Because of the existing bias in gender of viewers to whom ads have been served during the campaign, the system 300 will attempt to compensate for the bias. In this example, to remove the bias that has developed in the gender ratio, the system 300 will produce a bid shading factor less than 1.0. This will be multiplied by the bid produced by the bidder 248, 250, 252 to produce an adjusted bid amount. The adjusted bid amount will then be used in the auction among all bidders 248, 250, 252. Because the adjusted bid amount is decreased relative to the bid produced by the bidder, the likelihood is decreased of winning the auction and serving the ad to the current impression, identified as a male viewer. This will tend to reduce the apparent bias or to remove the skew in ad serving.

In some embodiments, the controller 306 may implement as the model 314 the relation $$\rho_{pace} = \frac{\sum p(\text{impressions served since 0 hour})}{\text{total number of impressions served}}.$$

The number $\rho_{pace}$ is a pacing factor. It may be computed periodically, such as every hour by summing over past time periods. The pacing factor $\rho_{pace}$ in this example determines the total probability of, for example an impression being served to a female, and divides by total number of impressions served to determine an average probability over time. The numerator represents that probability of the characteristic occurring (gender, in this example) since the beginning of the campaign or over any other predetermined period, e.g., the probability that the impression or ad request is coming from a male user, for example. The denominator represents the total number of impressions served since the beginning of the campaign. This information may be retrieved from stored data or determined from stored data collected during processing of advertisements and impressions or may be determined in any suitable fashion. The pacing factor $\rho_{pace}$ may be used to shade bids produced by bidders responding to an ad call or impression. The pacing factor $\rho_{pace}$ may have a value from 0 to X, for example, where X is set as the maximum pacing value. A value of 10 is one exemplary value for X. The pacing factor $\rho_{pace}$ often will have a value slightly larger than 1.0 or slightly smaller than 1.0 in order to control pacing of a campaign to reduce perceived bias in a characteristic such as gender of impression viewers. After a bidder 248, 250, 252 (FIG. 2B) determines bid values based on other factors the pacing factor $\rho_{pace}$ may be used to shade the bidder's vid value prior to determining a winning bid for the impression in an auction. The bidder's bid value is shaded by the pacing factor to increase or decrease the likelihood of the bid winning the auction and thereby compensating for any bias that has accumulated during the campaign.

Operated in conjunction with the curve 318 for the bid shading system 300, the desired gender ratio $\rho$ 320 can be compared with the pacing factor $\rho_{pace}$. If the pacing factor $\rho_{pace}$ exceeds the desired gender ratio $\rho$320, then the system 300 should shade downward, or reduce the bid value submitted to the auction to fill the impression by the bidder. If the pacing factor $\rho_{pace}$ is substantially equal to the desired gender ratio $\rho$320, the system should not shade the bid positively or negatively but pass the bidder's determined bid to the auction without modification. If the pacing factor $\rho_{pace}$ is less than the desired gender ratio $\rho$320, the system should shade upward, or increase the bid value submitted to the auction to fill the current impression by the bidder. This may be expressed as follows:

$\rho_{pace} > \rho \rightarrow \text{shade} \uparrow$ $\rho_{pace} = \rho \pm \epsilon \rightarrow \text{shade} = 1$ $\rho_{pace} < \rho \rightarrow \text{shade} \uparrow$ In comparing $\rho_{pace}$ and $\rho \pm \epsilon$, it may be desirable in some embodiments to specify a small range of values $\pm \epsilon$ since the exact value may be difficult to achieve. Any other suitable technique may be used to generate or adjust a shading factor.

The model 314 may be trained in any suitable fashion. In one particular embodiment, at an interval which may be regular such as hourly, the model 314 or the controller 316 of the system queries all campaigns that have enabled a ratio pacing function. For each campaign that has enabled a ratio pacing function, the system 300 queries the composition of the audience reached so far. For example, the composition may be expressed as a male-to-female ratio. In deterministic or probabilistic fashion, each bidder knows how many male or female audience members the bidder has bid for, and how many auctions it has won. This data may be stored, for example, in data store 246 of the platform 214 (FIG. 2B). Such data is stored for other characteristics beyond gender, as well.

The system 300 then models the ratios that represent each characteristic of interest to an advertiser for each campaign. Characteristics may include gender, as in the present example, but may also include any other characteristic of interest to the advertiser, such as demographic, psychograph and behavioral characteristics. After updating the mode, the system 300 then notifies respective advertisers associated with campaigns to reflect the updated statistics. Further, the system 300 notifies the controller 306 that there are updated statistics on the composition of the audience reached per campaign. The controller 306 loads the new parameters for each respective campaign and applies new delivery rules to incoming ad requests.

Figure 3C:
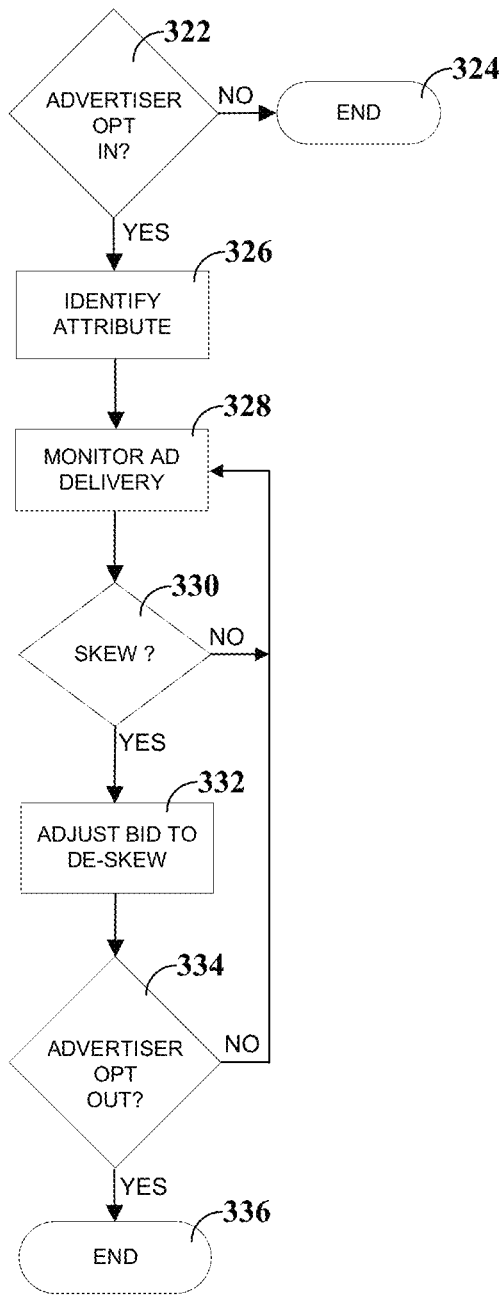
FIG. 3C is a flow diagram illustrating an exemplary, non-limiting embodiment of operation of a bid shading system in an advertising platform in accordance with various aspects described herein.

FIG. 3C is a flow diagram illustrating one embodiment of operation of a ratio pacing system in the advertising platform 214. The method 316 may implement a ratio pacing system, also referred to herein as a bid shading system, to adjust bid values in an online advertising platform to compensate for inadvertent bias in audience characteristics or parameters during serving of advertisements in response to impressions in an advertising campaign.

At block 322, it is determined if the advertiser opts into the ratio pacing system for the campaign. The campaign is defined by, for example, one or more target audience segments, a keyword or keywords or a line item, and data supporting and produced by the progress of the campaign. The campaign is managed by a campaign manager on behalf of an advertiser. If the campaign manager determines or suspects that there is or will be an unintended bias or skew in the delivery of ads, creating an unintentional unfairness in the delivery of ads, the campaign manager will opt in to the ratio pacing campaign. This may be done through a dashboard provided for the campaign manager by the advertising platform. If the campaign manager does not opt in for this campaign, the method 316 ends at block 324.

If the campaign manager opts in to the ratio pacing operation, at block 326, a pacing attribute is determined. In the present example, gender of an impression viewer is used. Gender in this example has a binary value, male or female. Other gender values may be used as well. Also, any other suitable characteristic or attribute of the campaign may be selected to monitor, including any demographic, behavioral or psychographic characteristic. The goal is to detect any unintentional skew in delivery of ads, where the skew or bias is a variation from a campaign goal of the campaign manager. For example, the campaign manager may desire to serve 80% of ads to a female audience. If, after progress of the campaign over time, data show 85% or 75% of ads have been served to female viewers, a skew or bias has occurred and may be corrected.

At block 328, the delivery of ads in response to received impressions occurs. As described in more detail herein, or in accordance with other embodiments of ad serving systems, ad calls are received, bids are received, and a winning bid is accepted. The winning bid is then used to fill the ad call. As this process continues, data is accumulated which characterizes the campaign. At block 330, it is determined from the accumulated data whether a skew has occurred in the data. For example, in example above, if 85% of impressions were filled to female viewers when the campaign goal was 80%, a skew or bias has arisen.

At block 332, steps are taken to correct the skew or bias. In some embodiments, the system 300 of FIG. 3A may be implemented to develop a bid shading value. The system 300 may produce a bid shading value that will reduce the likelihood of a bid being the winning bid. The system 300 may produce a bid shading value that will increase the likelihood of a bid being the winning bid. In some embodiments, the system 300 may decide to produce no bid at all, for example, if the skew exceeds a predetermined threshold and the skew or bias would be made worse if the current impression was filled.

After adjusting the bid and proceeding with bidding for the auction, the system determines at block 334 if the advertiser or campaign manager has opted out of the ratio pacing system. The advertiser or campaign manager may opt out at any time for any reason. If the advertiser or campaign manager did not opt out, control returns to block 338 to continue monitoring ad delivery and detecting skew or bias. If the advertiser or campaign manager did opt out, the method ends at block 336.

Figure 3D:
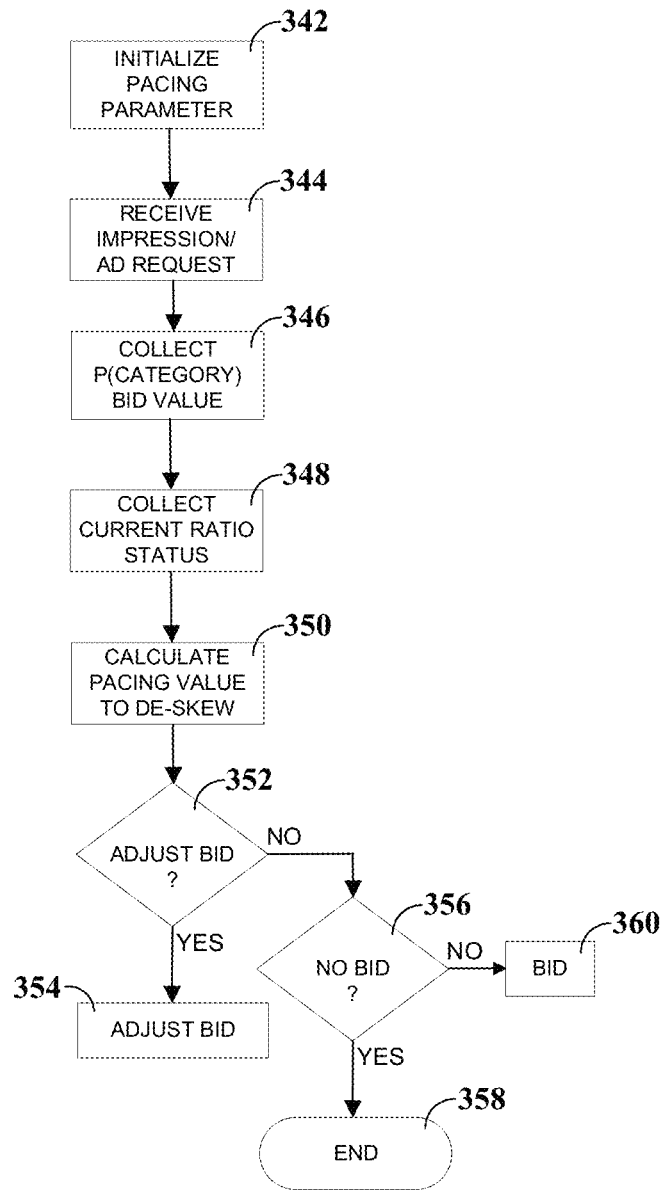
FIG. 3D is a flow diagram illustrating an exemplary, non-limiting embodiment of a bid shading system in accordance with various aspects described herein.

FIG. 3D is a flow diagram illustrating an exemplary, non-limiting embodiment of operation of a bid shading system in accordance with various aspects described herein. In some embodiments, the method 340 of FIG. 3D may be implemented by the system 300 of FIG. 3A. The method 340 may implement a ratio pacing method in accordance with embodiment described herein.

At block 342, the system initializes one or more pacing parameters. In some examples, gender of an impression is chosen as the pacing parameter. Gender refers to the gender of a viewer associated with a current impression in an advertising serving system. Gender may be deterministic or probabilistic. A gender will be probabilistic when, given information received about the impression, it can only be concluded with a specified probability that the impression has a particular gender. The information received about the impression may include demographic, geographic and other information, past browsing history, cookie file data, etc., as discussed herein. Any other characteristic or parameter, other than or in addition to gender, may be chosen as the pacing parameter. Examples included demographic parameters such as income, geographic location, age, etc. Examples also include psychographic and behavioral information for the impression. In some example, more than one pacing parameter may be processed simultaneously.

At block 344, an impression or ad request or ad call is received by the system for processing. These are simply referred to as impression herein. The impression may be generated or received, for example, when a user views a web page on a device such as a computer, a tablet, a mobile device or a connected television. The web page may include advertising slots or locations to be filled with advertisements or other content. In accordance with some embodiments, an auction is conducted by an advertising platform to select an ad to fill the impression. The received impression may include any suitable data organized in any suitable manner. For example, the impression may include information about the user who views the web page, including demographic, geographic, psychographic or behavioral information. In a particular example, the impression includes information about the gender of the user, meaning one or more human entities, (e.g. having a capacity to make inference based, at least, on complex mathematical formalisms), which can provide simulated vision, sound recognition and so forth. The gender information may be probabilistic in nature, such as an 80% probability the user is female.

At block 346, the system retrieves a bid value produced for the impression and a probability of each category the specified attribute. In some embodiments, the bid value is produced by a bidder such as bidders 348, 350, 352 as described herein. Conventionally, the bids produced by such bidders are used in auction to determine an advertisement to fill the impression. In accordance with some embodiments, the bid may be adjusted prior to submission to the auction. The bid value may be retrieved from any suitable location, such as storage logs 312 (FIG. 3A). In some embodiments, the specified attribute of interest is gender. The probability p(category) corresponds to the probability that the impression has a female gender, p(female), or that the impression has a male gender, p(male). This corresponds to the probability that the viewer of the web page and advertisements thereon is female or male. The probability p(category) may be retrieved from any suitable storage such as the storage logs 312, or may be received with other data forming the impression. The bid value and the category probabilities may be forwarded, in some examples, to the controller 306 of FIG. 3A.

At step 348, a current ratio status is collected. The current ratio status is the ratio of impressions filled for each category for the specified attribute. This may be a number that varies over time, as a campaign progresses and impressions are filled. When an impression is filled, data is stored about the impression, including information about categories of attributes of interest. For example, where the specified attribute is gender and where possible categories are male and female, the current ratio status may be female:male ratio, and may have a current value of 0.85. As more ads are served and impressions are filled, the current ratio status may and likely will vary, in the manner shown in FIG. 3B.

At block 350, based on the current ratio status, the system generates a pacing value to de-skew the serving of ads, or remove any unintentional bias, if necessary. In the manner illustrated by FIG. 3B, the current ratio status, as a function of time, may vary from a campaign goal ratio. The present embodiments detect the variation and determine if a bias exists and if it should be corrected. If so, at block 350, a pacing value to compensate for the detected bias is determined. In some embodiments illustrated herein, the controller 306 may output a pacing value that is used to shade the bid value. If the delivery ratio is currently skewed by an amount or a percent and the current ad request would increase the skew, the system will adjust the pacing value to un-skew the delivery of ads. This shading pacing modifier effectively increases or decreases the probability that this ad request will be served, and by that is able to balance the delivery mechanism and reduce the skew.

At block 352, the system determines if the bid should be adjusted. If applying the pacing value with reduce the skew, the system may output the pacing value and adjust the bid accordingly, block 354. A bid is then submitted to the auction, block 355. In some cases, bidding or adjusting the bid may not operate to reduce a detected skew. That may occur, for example, if the current ratio status shows too many female impressions have been filled and the current impression has a probability of being female. If not bidding is the best option to reduce the current skew, the method ends at block 358 and no bid is produced to fill the impression. If bidding in the auction, using the pacing value to adjust the bid value to increase or decrease the likelihood that adjust bid is the winning bid, is the best option to reduce the current skew, at block 360 the bid amount is adjusted and the bid is submitted to the auction.

Some embodiments involve a pre-existing media buy. A preexisting media buy is typically established by way of a contractual agreement between an impression seller member and an impression buyer member. The contractual agreement specifies the specific impression inventory that is subject to an exclusive first right of refusal on the part of the impression buyer member, and the reserve price that bidders other than the bidder operating on behalf of the impression buyer member must meet in order to take the impression inventory away.

In the case of a pre-existing media buy, there is no auction to select a winning bid. However, the principles of the examples described herein may be readily extended to the pre-existing media buy embodiment. For example, gender distribution is still tracked in a pre-existing media buy arrangement and a decision on bid/no bid can be still used. In that case, even though the media is paid but the fairness ratio is exceeded, the system might decide to not show an impression.

Figure 3E:
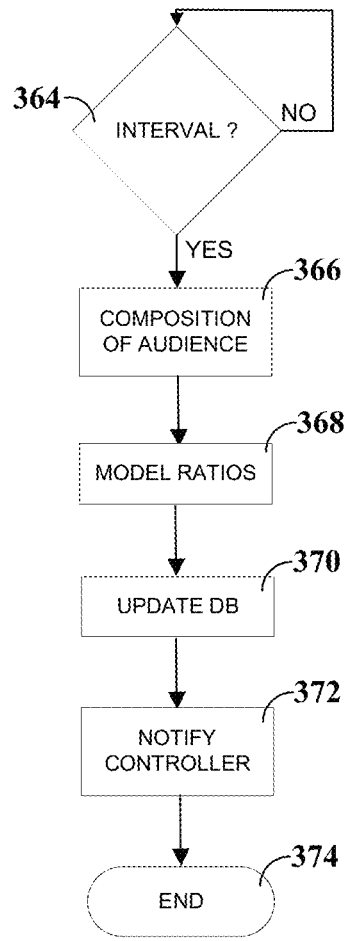
FIG. 3E is a flow diagram illustrating an exemplary, non-limiting embodiment of operation of a bid shading system in accordance with various aspects described herein.

FIG. 3E is a flow diagram illustrating an exemplary, non-limiting embodiment of operation of a bid shading system in accordance with various aspects described herein. In particular, FIG. 3E illustrates a method 362 for updating a model such as model 314 in the bid shading system 300 of FIG. 3A. The method 362 in some embodiments may be performed at intervals, such as hourly. The method begins at block 364 where processing is suspended until completion of the specified interval. For example, after an hour has elapsed while impressions are received and advertisements are selected to fill the received impressions, the test of block 364 will be true and control proceeds to block 366.

At block 366, the system query all the campaigns that have the ratio pacing feature enabled. As noted above, a campaign manager in some embodiments must opt in to the ratio pacing feature. At block 306, only campaigns which have the feature activated will be queried for their current status and data.

At block 366, for each queried campaign, the system queries the composition of the audience reached so far. For example, for an attribute or characteristic of interest, the system will determine how many impressions for each category have been filled. If the attribute of interest is gender, and possible categories are male and female, this data may be retrieved and processed for the campaign to date. At block 368, for each queried campaign, the system will model the ratios that represent each category of each attribute that are of interest to the advertiser or campaign manager. At block 370, the system will update the database (DB) of campaigns for attributes ratios relationships. For example, data stored in the storage logs 312 (FIG. 3A) may be updated for subsequent usage by the model 314.

At block 372, the system may notify the controller 306 that there are updated statistics on the composition of the audience reached per campaign. The method for training the model 314 ends at block 374.

While for purposes of simplicity of explanation, the respective processes are shown and described as a series of blocks in FIGS. 3C, 3D and 3E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
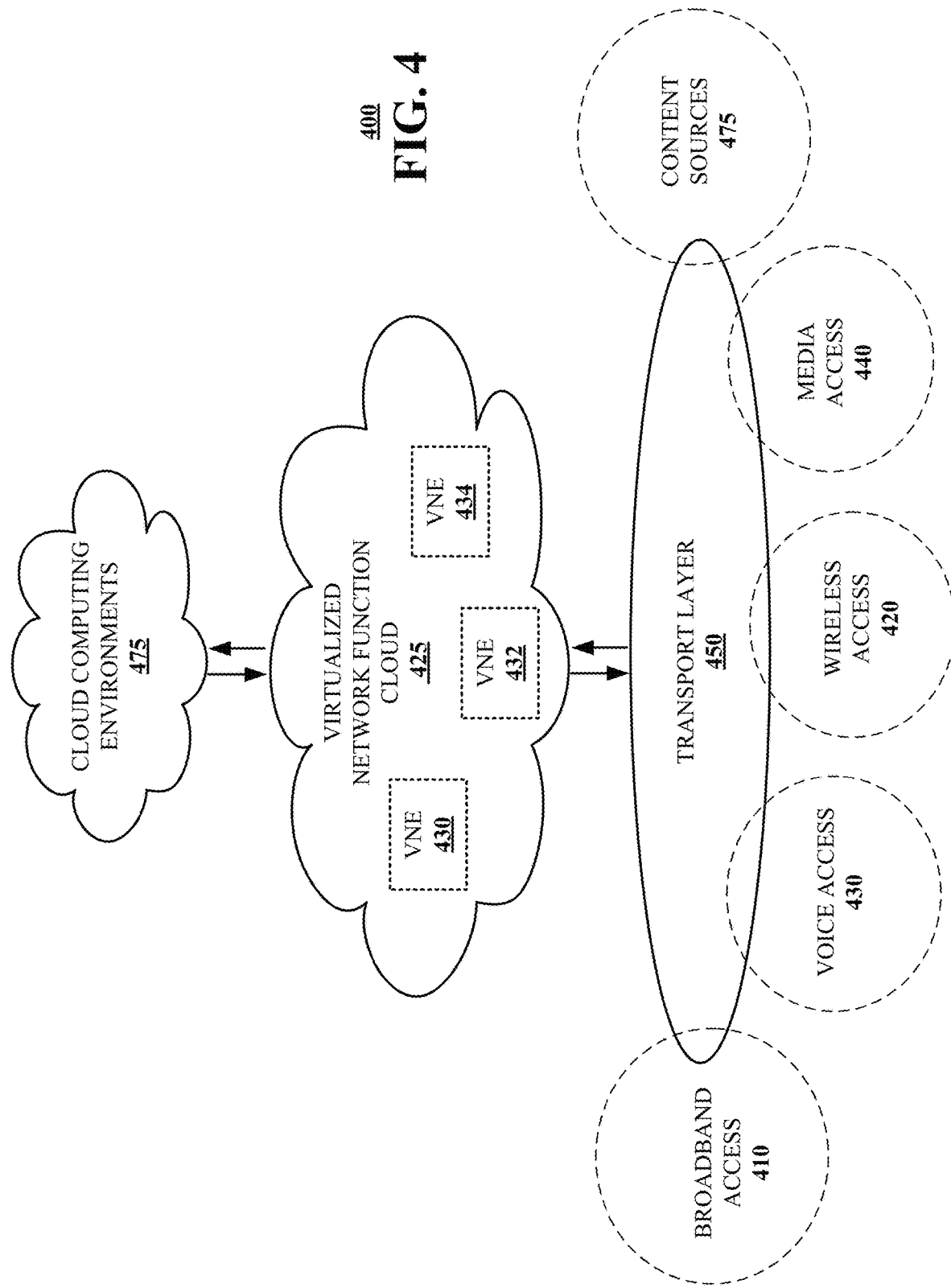
FIG. 4 is a block diagram illustrating an example, non-limiting embodiment of a virtualized communication network in accordance with various aspects described herein.

Referring now to FIG. 4, a block diagram 400 is shown illustrating an example, non-limiting embodiment of a virtualized communication network in accordance with various aspects described herein. In particular a virtualized communication network is presented that can be used to implement some or all of the subsystems and functions of communication network 100, the subsystems and functions of systems, and methods presented in FIGS. 1, 2A, 2B, 2C, 2D, 2E, 2F and 3A, 3B, 3C, 3D and 3E. For example, virtualized communication network 400 can facilitate in whole or in part an online content delivery system which conducts an auction among bids to server an advertisement to a web page to fill an impression. The virtualized communication network 400 can implement a ratio pacing system to detect and compensate for unintentional bias or skew introduced in serving of content items.

In particular, a cloud networking architecture is shown that leverages cloud technologies and supports rapid innovation and scalability via a transport layer 450, a virtualized network function cloud 425 and/or one or more cloud computing environments 475. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 430, 432, 434, etc. that perform some or all of the functions of network elements 450, 452, 454, 456, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 430 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 450 includes fiber, cable, wired and/or wireless transport elements, network elements and interfaces to provide broadband access 410, wireless access 420, voice access 430, media access 440 and/or access to content sources 475 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 430, 432 or 434. These network elements can be included in transport layer 350.

The virtualized network function cloud 425 interfaces with the transport layer 450 to provide the VNEs 430, 432, 434, etc. to provide specific NFVs. In particular, the virtualized network function cloud 425 leverages cloud operations, applications, and architectures to support networking workloads. The virtualized network elements 430, 432 and 434 can employ network function software that provides either a one-for-one mapping of traditional network element function or alternately some combination of network functions designed for cloud computing. For example, VNEs 430, 432 and 434 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and overall which creates an elastic function with higher availability than its former monolithic version. These virtual network elements 430, 432, 434, etc. can be instantiated and managed using an orchestration approach similar to those used in cloud compute services.

The cloud computing environments 475 can interface with the virtualized network function cloud 425 via APIs that expose functional capabilities of the VNEs 430, 432, 434, etc. to provide the flexible and expanded capabilities to the virtualized network function cloud 425. In particular, network workloads may have applications distributed across the virtualized network function cloud 425 and cloud computing environment 475 and in the commercial cloud, or might simply orchestrate workloads supported entirely in NFV infrastructure from these third party locations.

Figure 5:
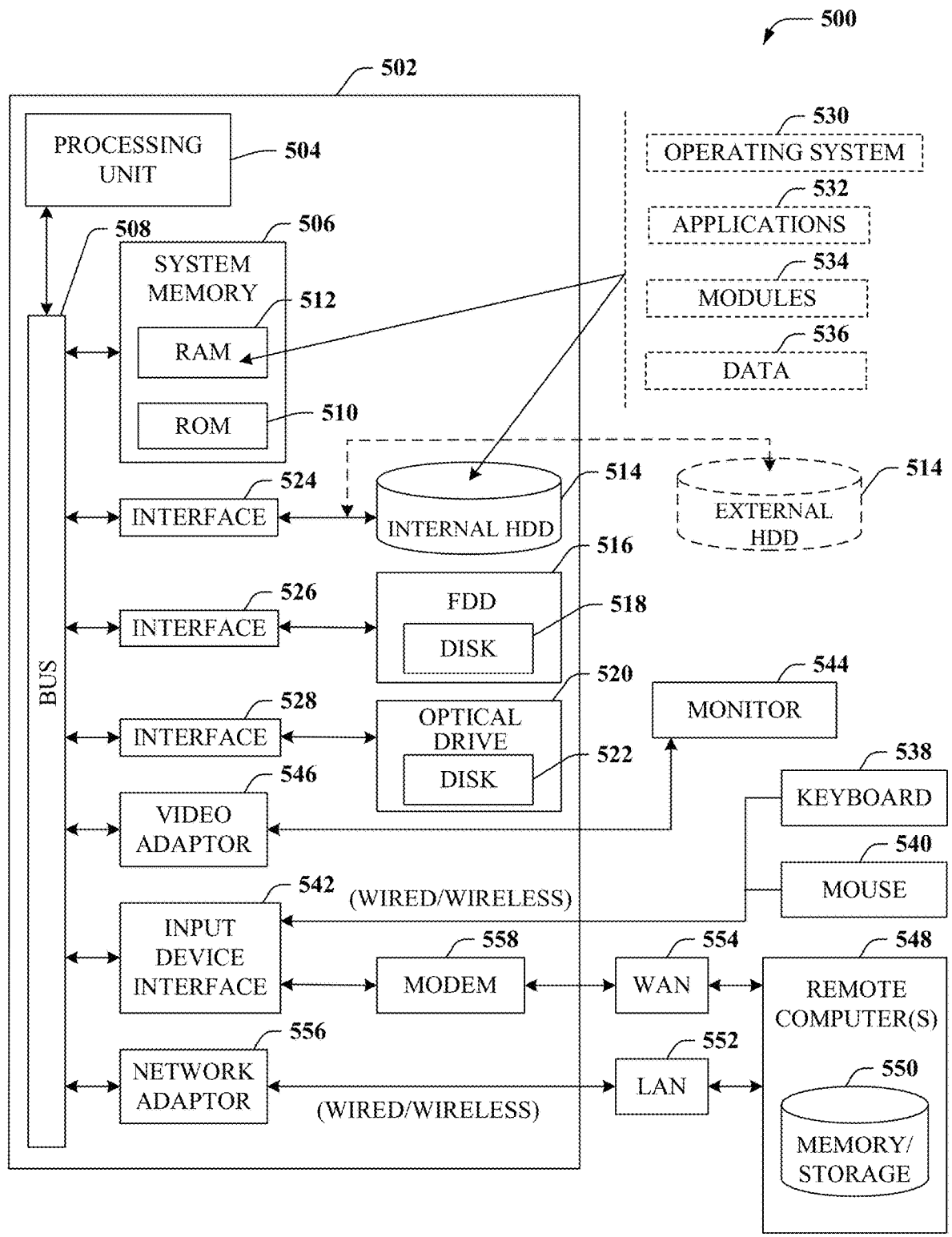
FIG. 5 is a block diagram of an example, non-limiting embodiment of a computing environment in accordance with various aspects described herein.

Turning now to FIG. 5 there is illustrated a block diagram of a computing environment in accordance with various aspects described herein. In order to provide additional context for various embodiments of the embodiments described herein, FIG. 5 and the following discussion are intended to provide a brief, general description of a suitable computing environment 500 in which the various embodiments of the subject disclosure can be implemented. In particular, computing environment 500 can be used in the implementation of network elements 150, 152, 154, 156, access terminal 112, base station or access point 122, switching device 132, media terminal 142, and/or VNEs 430, 432, 434, etc. Each of these devices can be implemented via computer-executable instructions that can run on one or more computers, and/or in combination with other program modules and/or as a combination of hardware and software. For example, computing environment 500 can facilitate in whole or in part an online content delivery system which conducts an auction among bids to server an advertisement to a web page to fill an impression. The communication network 100 can implement a ratio pacing system to detect and compensate for unintentional bias or skew introduced in serving of content items.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 5, the example environment can comprise a computer 502, the computer 502 comprising a processing unit 504, a system memory 506 and a system bus 508. The system bus 508 couples system components including, but not limited to, the system memory 506 to the processing unit 504. The processing unit 504 can be any of various commercially available processors. Dual microprocessors and other multiprocessor architectures can also be employed as the processing unit 504.

The system bus 508 can be any of several types of bus structure that can further interconnect to a memory bus (with or without a memory controller), a peripheral bus, and a local bus using any of a variety of commercially available bus architectures. The system memory 506 comprises ROM 510 and RAM 512. A basic input/output system (BIOS) can be stored in a non-volatile memory such as ROM, erasable programmable read only memory (EPROM), EEPROM, which BIOS contains the basic routines that help to transfer information between elements within the computer 502, such as during startup. The RAM 512 can also comprise a high-speed RAM such as static RAM for caching data.

The computer 502 further comprises an internal hard disk drive (HDD) 514 (e.g., EIDE, SATA), which internal HDD 514 can also be configured for external use in a suitable chassis (not shown), a magnetic floppy disk drive (FDD) 516, (e.g., to read from or write to a removable diskette 518) and an optical disk drive 520, (e.g., reading a CD-ROM disk 522 or, to read from or write to other high capacity optical media such as the DVD). The HDD 514, magnetic FDD 516 and optical disk drive 520 can be connected to the system bus 508 by a hard disk drive interface 524, a magnetic disk drive interface 526 and an optical drive interface 528, respectively. The hard disk drive interface 524 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 502, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 512, comprising an operating system 530, one or more application programs 532, other program modules 534 and program data 536. All or portions of the operating system, applications, modules, and/or data can also be cached in the RAM 512. The systems and methods described herein can be implemented utilizing various commercially available operating systems or combinations of operating systems.

A user can enter commands and information into the computer 502 through one or more wired/wireless input devices, e.g., a keyboard 538 and a pointing device, such as a mouse 540. Other input devices (not shown) can comprise a microphone, an infrared (IR) remote control, a joystick, a game pad, a stylus pen, touch screen or the like. These and other input devices are often connected to the processing unit 504 through an input device interface 542 that can be coupled to the system bus 508, but can be connected by other interfaces, such as a parallel port, an IEEE 1394 serial port, a game port, a universal serial bus (USB) port, an IR interface, etc.

A monitor 544 or other type of display device can be also connected to the system bus 508 via an interface, such as a video adapter 546. It will also be appreciated that in alternative embodiments, a monitor 544 can also be any display device (e.g., another computer having a display, a smart phone, a tablet computer, etc.) for receiving display information associated with computer 502 via any communication means, including via the Internet and cloud-based networks. In addition to the monitor 544, a computer typically comprises other peripheral output devices (not shown), such as speakers, printers, etc.

The computer 502 can operate in a networked environment using logical connections via wired and/or wireless communications to one or more remote computers, such as a remote computer(s) 548. The remote computer(s) 548 can be a workstation, a server computer, a router, a personal computer, portable computer, microprocessor-based entertainment appliance, a peer device or other common network node, and typically comprises many or all of the elements described relative to the computer 502, although, for purposes of brevity, only a remote memory/storage device 550 is illustrated. The logical connections depicted comprise wired/wireless connectivity to a local area network (LAN) 552 and/or larger networks, e.g., a wide area network (WAN) 554. Such LAN and WAN networking environments are commonplace in offices and companies, and facilitate enterprise-wide computer networks, such as intranets, all of which can connect to a global communications network, e.g., the Internet.

When used in a LAN networking environment, the computer 502 can be connected to the LAN 552 through a wired and/or wireless communication network interface or adapter 556. The adapter 556 can facilitate wired or wireless communication to the LAN 552, which can also comprise a wireless AP disposed thereon for communicating with the adapter 556.

When used in a WAN networking environment, the computer 502 can comprise a modem 558 or can be connected to a communications server on the WAN 554 or has other means for establishing communications over the WAN 554, such as by way of the Internet. The modem 558, which can be internal or external and a wired or wireless device, can be connected to the system bus 508 via the input device interface 542. In a networked environment, program modules depicted relative to the computer 502 or portions thereof, can be stored in the remote memory/storage device 550. It will be appreciated that the network connections shown are example and other means of establishing a communications link between the computers can be used.

The computer 502 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 6:
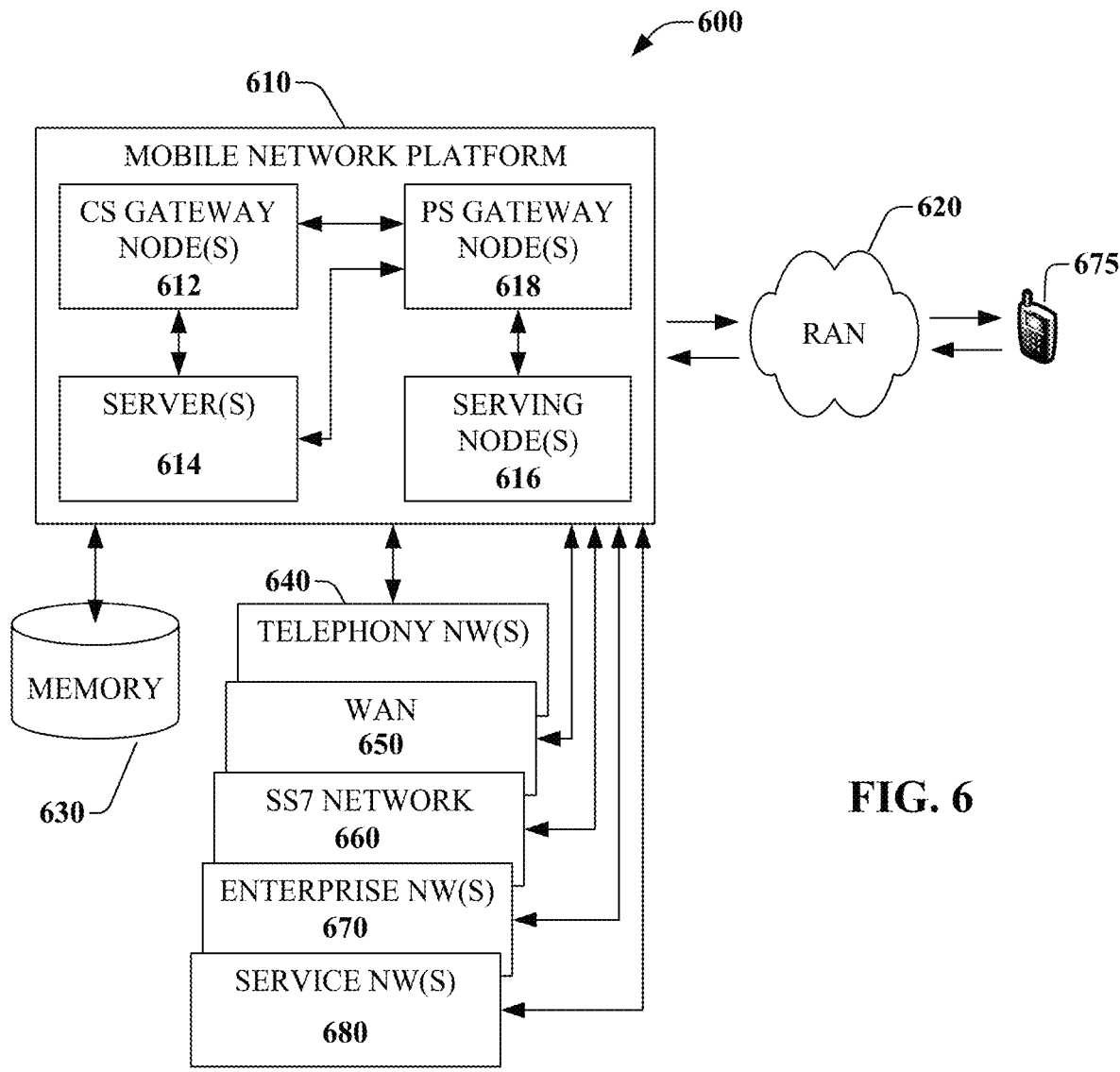
FIG. 6 is a block diagram of an example, non-limiting embodiment of a mobile network platform in accordance with various aspects described herein.

Turning now to FIG. 6, an embodiment 600 of a mobile network platform 610 is shown that is an example of network elements 150, 152, 154, 156, and/or VNEs 430, 432, 434, etc. For example, platform 610 can facilitate in whole or in part an online content delivery system which conducts an auction among bids to server an advertisement to a web page to fill an impression. The communication network 100 can implement a ratio pacing system to detect and compensate for unintentional bias or skew introduced in serving of content items. In one or more embodiments, the mobile network platform 610 can generate and receive signals transmitted and received by base stations or access points such as base station or access point 122. Generally, mobile network platform 610 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 610 can be included in telecommunications carrier networks, and can be considered carrier-side components as discussed elsewhere herein. Mobile network platform 610 comprises CS gateway node(s) 612 which can interface CS traffic received from legacy networks like telephony network(s) 640 (e.g., public switched telephone network (PSTN), or public land mobile network (PLMN)) or a signaling system #7 (SS7) network 660. CS gateway node(s) 612 can authorize and authenticate traffic (e.g., voice) arising from such networks. Additionally, CS gateway node(s) 612 can access mobility, or roaming, data generated through SS7 network 660; for instance, mobility data stored in a visited location register (VLR), which can reside in memory 630. Moreover, CS gateway node(s) 612 interfaces CS-based traffic and signaling and PS gateway node(s) 618. As an example, in a 3GPP UMTS network, CS gateway node(s) 612 can be realized at least in part in gateway GPRS support node(s) (GGSN). It should be appreciated that functionality and specific operation of CS gateway node(s) 612, PS gateway node(s) 618, and serving node(s) 616, is provided and dictated by radio technology or technologies utilized by mobile network platform 610 for telecommunication over a radio access network 620 with other devices, such as a radiotelephone 675.

In addition to receiving and processing CS-switched traffic and signaling, PS gateway node(s) 618 can authorize and authenticate PS-based data sessions with served mobile devices. Data sessions can comprise traffic, or content(s), exchanged with networks external to the mobile network platform 610, like wide area network(s) (WANs) 650, enterprise network(s) 670, and service network(s) 680, which can be embodied in local area network(s) (LANs), can also be interfaced with mobile network platform 610 through PS gateway node(s) 618. It is to be noted that WANs 650 and enterprise network(s) 670 can embody, at least in part, a service network(s) like IP multimedia subsystem (IMS). Based on radio technology layer(s) available in technology resource(s) or radio access network 620, PS gateway node(s) 618 can generate packet data protocol contexts when a data session is established; other data structures that facilitate routing of packetized data also can be generated. To that end, in an aspect, PS gateway node(s) 618 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 600, mobile network platform 610 also comprises serving node(s) 616 that, based upon available radio technology layer(s) within technology resource(s) in the radio access network 620, convey the various packetized flows of data streams received through PS gateway node(s) 618. It is to be noted that for technology resource(s) that rely primarily on CS communication, server node(s) can deliver traffic without reliance on PS gateway node(s) 618; for example, server node(s) can embody at least in part a mobile switching center. As an example, in a 3GPP UMTS network, serving node(s) 616 can be embodied in serving GPRS support node(s) (SGSN).

For radio technologies that exploit packetized communication, server(s) 614 in mobile network platform 610 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 610. Data streams (e.g., content(s) that are part of a voice call or data session) can be conveyed to PS gateway node(s) 618 for authorization/authentication and initiation of a data session, and to serving node(s) 616 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 610 to ensure network's operation and data integrity in addition to authorization and authentication procedures that CS gateway node(s) 612 and PS gateway node(s) 618 can enact. Moreover, provisioning server(s) can provision services from external network(s) like networks operated by a disparate service provider; for instance, WAN 650 or Global Positioning System (GPS) network(s) (not shown). Provisioning server(s) can also provision coverage through networks associated to mobile network platform 610 (e.g., deployed and operated by the same service provider), such as the distributed antennas networks shown in FIG. 1 that enhance wireless service coverage by providing more network coverage.

It is to be noted that server(s) 614 can comprise one or more processors configured to confer at least in part the functionality of mobile network platform 610. To that end, the one or more processor can execute code instructions stored in memory 630, for example. It is should be appreciated that server(s) 614 can comprise a content manager, which operates in substantially the same manner as described hereinbefore.

In example embodiment 600, memory 630 can store information related to operation of mobile network platform 610. Other operational information can comprise provisioning information of mobile devices served through mobile network platform 610, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 630 can also store information from at least one of telephony network(s) 640, WAN 650, SS7 network 660, or enterprise network(s) 670. In an aspect, memory 630 can be, for example, accessed as part of a data store component or as a remotely connected memory store.

In order to provide a context for the various aspects of the disclosed subject matter, FIG. 6, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 7:
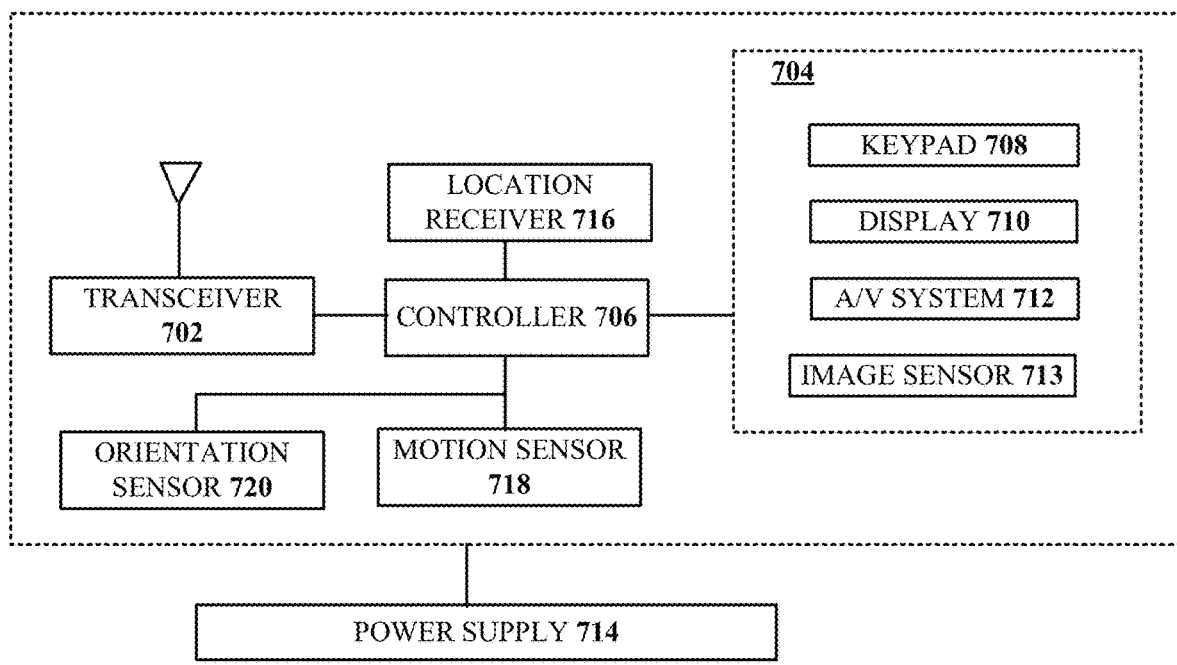
FIG. 7 is a block diagram of an example, non-limiting embodiment of a communication device in accordance with various aspects described herein.

Turning now to FIG. 7, an illustrative embodiment of a communication device 700 is shown. The communication device 700 can serve as an illustrative embodiment of devices such as data terminals 114, mobile devices 124, vehicle 126, display devices 144 or other client devices for communication via either communications network 125. For example, computing device 700 can facilitate in whole or in part an online content delivery system which conducts an auction among bids to server an advertisement to a web page to fill an impression. The communication network 100 can implement a ratio pacing system to detect and compensate for unintentional bias or skew introduced in serving of content items.

The communication device 700 can comprise a wireline and/or wireless transceiver 702 (herein transceiver 702), a user interface (UI) 704, a power supply 714, a location receiver 716, a motion sensor 718, an orientation sensor 720, and a controller 706 for managing operations thereof. The transceiver 702 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 702 can also be adapted to support circuit-switched wireline access technologies (such as PSTN), packet-switched wireline access technologies (such as TCP/IP, VoIP, etc.), and combinations thereof.

The UI 704 can include a depressible or touch-sensitive keypad 708 with a navigation mechanism such as a roller ball, a joystick, a mouse, or a navigation disk for manipulating operations of the communication device 700. The keypad 708 can be an integral part of a housing assembly of the communication device 700 or an independent device operably coupled thereto by a tethered wireline interface (such as a USB cable) or a wireless interface supporting for example Bluetooth®. The keypad 708 can represent a numeric keypad commonly used by phones, and/or a QWERTY keypad with alphanumeric keys. The UI 704 can further include a display 710 such as monochrome or color LCD (Liquid Crystal Display), OLED (Organic Light Emitting Diode) or other suitable display technology for conveying images to an end user of the communication device 700. In an embodiment where the display 710 is touch-sensitive, a portion or all of the keypad 708 can be presented by way of the display 710 with navigation features.

The display 710 can use touch screen technology to also serve as a user interface for detecting user input. As a touch screen display, the communication device 700 can be adapted to present a user interface having graphical user interface (GUI) elements that can be selected by a user with a touch of a finger. The display 710 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 710 can be an integral part of the housing assembly of the communication device 700 or an independent device communicatively coupled thereto by a tethered wireline interface (such as a cable) or a wireless interface.

The UI 704 can also include an audio system 712 that utilizes audio technology for conveying low volume audio (such as audio heard in proximity of a human ear) and high volume audio (such as speakerphone for hands free operation). The audio system 712 can further include a microphone for receiving audible signals of an end user. The audio system 712 can also be used for voice recognition applications. The UI 704 can further include an image sensor 713 such as a charged coupled device (CCD) camera for capturing still or moving images.

The power supply 714 can utilize common power management technologies such as replaceable and rechargeable batteries, supply regulation technologies, and/or charging system technologies for supplying energy to the components of the communication device 700 to facilitate long-range or short-range portable communications. Alternatively, or in combination, the charging system can utilize external power sources such as DC power supplied over a physical interface such as a USB port or other suitable tethering technologies.

The location receiver 716 can utilize location technology such as a global positioning system (GPS) receiver capable of assisted GPS for identifying a location of the communication device 700 based on signals generated by a constellation of GPS satellites, which can be used for facilitating location services such as navigation. The motion sensor 718 can utilize motion sensing technology such as an accelerometer, a gyroscope, or other suitable motion sensing technology to detect motion of the communication device 700 in three-dimensional space. The orientation sensor 720 can utilize orientation sensing technology such as a magnetometer to detect the orientation of the communication device 700 (north, south, west, and east, as well as combined orientations in degrees, minutes, or other suitable orientation metrics).

The communication device 700 can use the transceiver 702 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 706 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 7 can be used in one or more embodiments of the subject disclosure. For instance, the communication device 700 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x)=confidence$ (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A computing system comprising:
   one or more processors; and
   memory that stores instructions that, when executed by the one or more processors, cause the one or more processors to perform acts comprising:
   receiving, by way of a network connection and from a second computing system, an ad call, where the ad call indicates that an electronic content resource is to be displayed to a user of a client computing device, the ad call includes user data pertaining to the user and location data in the electronic resource, where an advertisement is desirably placed within the electronic resource at a location defined by the location data;
   in response to receiving the ad call, outputting, by way of an impressions bus, a bid request to a real-time bidder system, wherein the bid request comprises:
      the location in the electronic content resource; and
      the user data pertaining to the user;
   generating, by way of the real-time bidder system and in response to receipt of the bid request, an initial bid for the bid request;
   adjusting, by way of the real-time bidder system, the initial bid to create an adjusted bid, wherein the adjusting is based upon a user characteristic indicated in the user data, an advertising campaign target relating to a category of the user characteristic, and historic advertising campaign data indicating performance of the advertising campaign relative to the category, where the advertising campaign target specifies a target ratio of users having the user characteristic to users failing to have the user characteristic who are to receive advertisements in the advertising campaign;
   receiving, at the impressions bus and from the bidder system, the adjusted bid, where the adjusted bid is configured to cause an actual ratio of users having the user characteristic to users failing to have the user characteristic to move toward the target ratio; and
   responsive to determining, by way of the impressions bus, that the adjusted bid is a winning bid pertaining to the bid request, causing a creative corresponding to the adjusted bid to be placed at the location in the electronic content resource.

2. The computing system of claim 1, wherein the historic advertising campaign data indicates the actual ratio of users having the user characteristic to users failing to have the user characteristic.

3. The computing system of claim 2, wherein the ratio is a ratio of males to females, and wherein the historic advertising campaign data indicates at least one of a number of male viewers or female viewers of ads of the advertising campaign.

4. The computing system of claim 2, wherein the adjusting the initial bid to create the adjusted bid comprises:
   responsive to determining that the actual ratio is less than the targeted ratio, setting a bid price of the adjusted bid such that the bid price of the adjusted bid is higher than a bid price of the initial bid; and
   responsive to determining that the actual ratio is greater than the targeted ratio, setting the bid price of the adjusted bid such that the bid price of the adjusted bid is lower than the bid price of the initial bid.

5. The computing system of claim 1, the acts further comprising: estimating a probability of the user having the user characteristic based upon the user data, wherein the adjusting is based upon the estimated probability.

6. The computing system of claim 1, wherein adjusting the initial bid to create the adjusted bid comprises:
   increasing a first bid price of the initial bid such that a second bid price of the adjusted bid is higher than the first bid price responsive to determining that performance of the advertising campaign relative to the user characteristic is below the advertising campaign target; and decreasing the first bid price of the initial bid such that the second bid price of the adjusted bid is lower than the first bid price responsive to determining that performance of the advertising campaign relative to the user characteristic is above the advertising campaign target.

7. The computing system of claim 1, the acts further comprising:

responsive to determining that the adjusted bid is the winning bid pertaining to the bid request, updating the historic advertising campaign data to indicate that an additional ad in the advertising campaign has been served to a viewer having the user characteristic.

8. A computing system comprising:

one or more processors; and memory that stores instructions that, when executed by the one or more processors, cause the one or more processors to perform acts comprising:

receiving, over a network connection between the computing system and a second computing system and at a real-time bidder system, a bid request from an advertising platform, the bid request comprises;

a location in an electronic content resource within which an advertisement that is to be displayed to a user is desirably placed; and user data that is indicative of a characteristic of the user;

generating, by the real-time bidder system, an initial bid for the bid request, the initial bid being for presentment of a creative in the electronic content resource at the location;

subsequent to generating the initial bid, adjusting, by the real-time bidder system, the initial bid to create an adjusted bid, wherein the initial bid is adjusted to create the adjusted bid based upon:

the characteristic of the user indicated in the user data;

an advertising campaign target for an advertising campaign, where the advertising campaign target relates to a category of the user characteristic, and further where the advertising campaign target specifies a target ratio of users in the category who have the characteristic relative to a total audience of the advertisement campaign; and historic advertising campaign data indicating performance of the advertising campaign relative to the category; and outputting, by the real-time bidder system, the adjusted bid to the advertising platform, the adjusted bid configured such that responsive to the advertising platform determining that the adjusted bid is a winning bid pertaining to the bid request, the creative corresponding to the adjusted bid is caused to be placed at the location in the electronic content resource, and further where placement of the creative causes an actual ratio of users in the category who have the characteristic relative to the total audience of the advertisement campaign to move toward the target ratio.

9. The computing system of claim 8, wherein adjusting the initial bid to create the adjusted bid comprises:

computing a pacing factor relative to the advertising campaign based upon the historic advertising campaign data, the pacing factor indicative of an average probability of an ad of the advertising campaign being presented to a user having the user characteristic; and adjusting the initial bid based upon a difference between the pacing factor and an intended fraction of viewers of ads in the advertising campaign having the user characteristic.

10. The computing system of claim 8, wherein the category is one of:

a demographic category;

a geographic category;

a psychographic category; or a behavioral category.

11. The computing system of claim 10, wherein the category is a demographic category, wherein the demographic category is at least one of:

gender;

income;

age; or marital status.

12. The computing system of claim 10, wherein the geographic category pertains to at least one of a present location of the user or a location of a residence of the user.

13. The computing system of claim 8, wherein the electronic content resource is a web page.

14. The computing system of claim 8, wherein the electronic content resource is a video.

15. The computing system of claim 8, wherein the bid request corresponds to an ad call received by the advertising platform from the second computing system.

16. The computing system of claim 8, wherein adjusting the initial bid to create the adjusted bid comprises:

increasing a first bid price of the initial bid such that a second bid price of the adjusted bid is higher than the first bid price responsive to determining that performance of the advertising campaign relative to the user characteristic is below the advertising campaign target; and decreasing the first bid price of the initial bid such that the second bid price of the adjusted bid is lower than the first bid price responsive to determining that performance of the advertising campaign relative to the user characteristic is above the advertising campaign target.

17. A method performed by a real-time bidder system executing on a computing system, the method comprising:

obtaining, by the real-time bidder system, a bid request from an advertising platform, the bid request comprises:

a location in a webpage within which an advertisement is desirably placed; and user data pertaining to a user to whom the advertisement is desirably provided;

generating, by the real-time bidder system, an initial bid for the bid request, the initial bid generated for placement of a creative at the location within the webpage;

subsequent to generating the initial bid, adjusting the initial bid to create an adjusted bid, wherein the adjusted bid is based upon:

a user characteristic indicated in the user data;

an advertising campaign target relating to a category of the user characteristic, where the advertising campaign target is for an advertising campaign, and further where the advertising campaign target defines a target ratio of users in the category who have the user characteristic relative to a total audience of the advertising campaign; and historic advertising campaign data indicating performance of the advertising campaign relative to the category; and outputting, by the real-time bidder system, the adjusted bid to the advertising platform, the adjusted bid configured such that responsive to the advertising platform determining that the adjusted bid is a winning bid pertaining to the bid request:

the creative corresponding to the adjusted bid is caused to be placed at the location in the electronic content resource; and an actual ratio of users in the category who have the user characteristic relative to the total audience of the advertising campaign moves towards the target ratio.

18. The method of claim 17, further comprising:

generating the bid request by way of the advertising platform, where the location and the user data are included in an ad call received by the advertising platform from a server computing device.

19. The method of claim 17, further comprising:

obtaining a second bid request from the advertising platform;

determining, based upon the historic advertising campaign data, that a skew of the advertising campaign relative to the advertising campaign target exceeds a threshold; and failing to submit a bid responsive to the second bid request based upon the skew of the advertising campaign exceeding the threshold.

20. The method of claim 17, wherein the adjusted bid is based further upon a maximum adjustment parameter that defines a maximum amount that the initial bid may be adjusted.

* * * * *